US012697822B2

United States Patent
(12) United States Patent
Zhang et al.

(10) Patent No.: US 12,697,822 B2
(45) Date of Patent: Aug. 4, 2026

(54) LIQUID EJECTION DEVICE

(71) Applicant: SEIKO EPSON CORPORATION, Tokyo (JP)

(72) Inventors: Bingruo Zhang, Matsumoto (JP); Katsuya Asamoto, Matsumoto (JP); Shigenori Nakagawa, Bangalore (IN)

(73) Assignee: Seiko Epson Corporation, Tokyo (JP)

(*) Notice: Subject to any disclaimer, the term of this patent is extended or adjusted under 35 U.S.C. 154(b) by 119 days.

(21) Appl. No.: 18/670,985

(22) Filed: May 22, 2024

(65) Prior Publication Data

US 2024/0391257 A1 Nov. 28, 2024

(30) Foreign Application Priority Data

May 25, 2023 (JP) ................................ 2023-086214

(51) Int. Cl.
*B41J 11/00* (2006.01)
*B41J 15/02* (2006.01)

(52) U.S. Cl.
CPC ........... *B41J 11/0022* (2021.01); *B41J 15/02* (2013.01)

(58) Field of Classification Search
CPC . B41J 2/17523; B41J 2/03; B41J 2/145; B41J 2/185; B41J 2202/12; B41J 2002/14419; B41J 2/14233; B41J 2/14145
USPC ............................................................ 347/47
See application file for complete search history.

(56) References Cited

U.S. PATENT DOCUMENTS

2006/0181583 A1* 8/2006 Usuda ...................... B41J 2/175 347/85
2017/0072708 A1* 3/2017 Miyashita ................ B41J 11/06

FOREIGN PATENT DOCUMENTS

JP 2015-217544 A 12/2015

* cited by examiner

*Primary Examiner* — Jason S Uhlenhake
*Assistant Examiner* — Alexander D Shenderov
(74) *Attorney, Agent, or Firm* — WORKMAN NYDEGGER

(57) ABSTRACT

A liquid ejection device includes a transport section configured to transport a medium along a first axis, a liquid ejection section configured to eject a liquid to the medium, a housing that houses the transport section and the liquid ejection section, a fan disposed at an end section of the housing along a second axis, which intersects the first axis of the housing, and that feeds air into the housing, a flow path member in which are formed an opening along the second axis and a flow passage for guiding air that was fed by the fan, a first partition plate disposed in the flow path and configured to guide, toward the opening, air fed along the second axis, and a second partition plate disposed in the flow path and configured to guide, toward the opening, air fed along the second axis.

15 Claims, 15 Drawing Sheets

LIQUID EJECTION DEVICE

The present application is based on, and claims priority from JP Application Serial Number 2023-086214, filed May 25, 2023, the disclosure of which is hereby incorporated by reference herein in its entirety.

BACKGROUND

1. Technical Field

The present disclosure relates to a liquid ejection device.

2. Related Art

An ink jet printer provided with a blower device is known. The ink jet printer described in JP-A-2015-217544 is provided with a plurality of blower devices. The blower devices are provided with a flow path forming member, a fan, and a fan cover. The flow path forming member is formed with a plurality of flow paths through which air passes. The fan feeds air to the plurality of flow paths. The fan cover covers the fan. The plurality of blower devices are arranged above the printing medium along the width of the printing medium.

When the fan is disposed above the print medium along the width of the print medium, the height of the case top surface of the ink jet printer increases. When the height of the upper surface of the case increases, the workability for the user may be reduced.

SUMMARY

A liquid ejection device according to the present disclosure is provided with a transport section configured to transport a medium along a first axis; a liquid ejection section configured to eject a liquid to the medium transported along the first axis; a housing that houses the transport section and the liquid ejection section; a fan that is disposed at an end section of the housing along a second axis, which intersects the first axis of the housing, and that feeds air into the housing; a flow path member in which are formed an opening along the second axis and a flow passage for guiding air that was fed in by the fan; a first partition plate that is disposed in the flow path and that is configured to guide, toward the opening, air fed along the second axis; and a second partition plate that is disposed in the flow path and that is configured to guide, toward the opening, air fed along the second axis.

DESCRIPTION OF EMBODIMENTS

Figure 1:
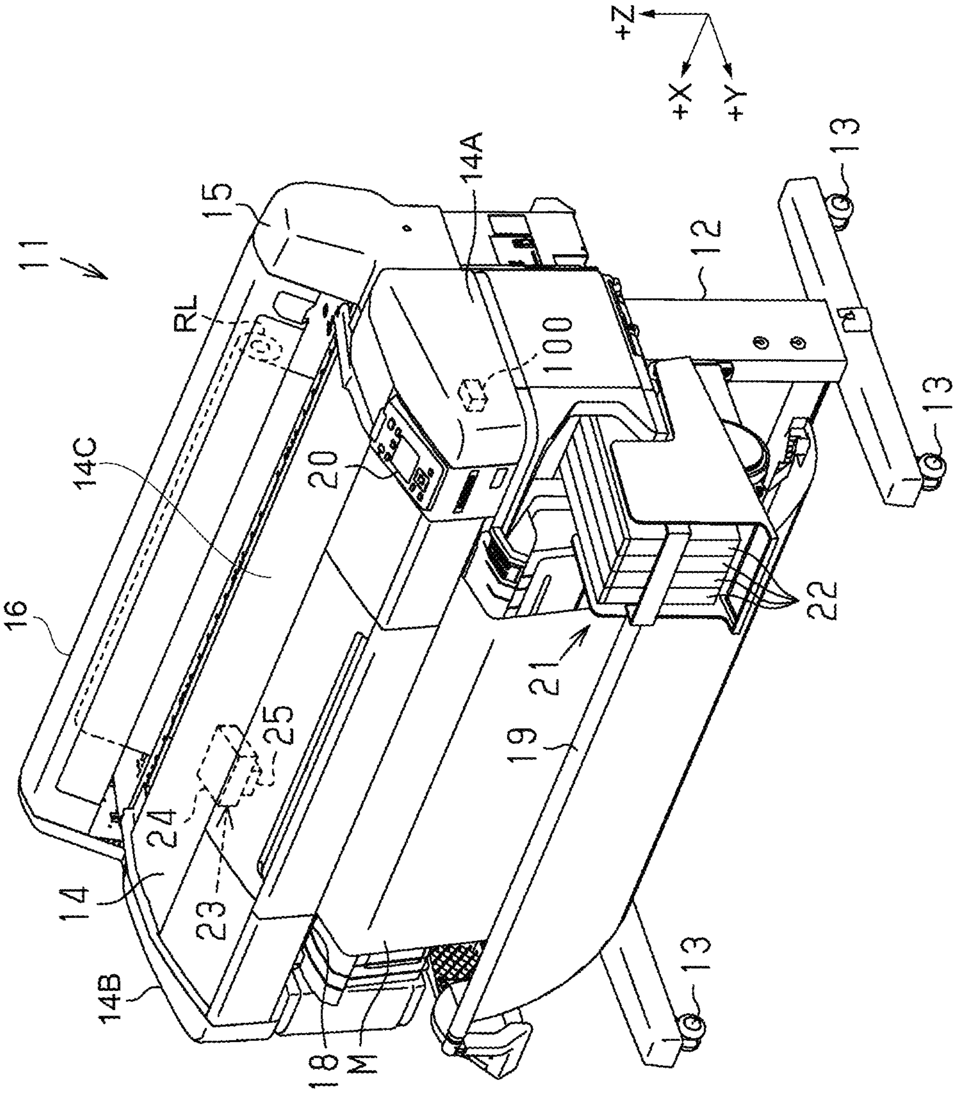
FIG. 1 is a diagram showing schematic configuration of a printing device.

FIG. 1 shows schematic configuration of a printing device 11. The printing device 11 is a serial scan type printer. The printing device 11 is, for example, a large format printer that performs printing on a large-size print medium M. The printing device 11 receives print data supplied from an external host computer or the like. The printing device 11 forms groups of dots on the printing medium M by ejecting ink based on the print data. The printing device 11 is an inkjet printer that forms groups of dots to print an image including characters, figures, and the like on a printing medium M. The printing device 11 corresponds to an example of a liquid ejection device. The print medium M corresponds to an example of a medium. Ink corresponds to an example of a liquid.

The drawings, including FIG. 1, show an XYZ coordinate system. The X-axis is an axis parallel to the direction in which the carriage 24 (to be described later) moves. The +X direction is a direction in which the carriage 24 moves away from the home position. The −X direction is a direction in which the carriage 24 moves toward the home position. The Y axis is an axis orthogonal to the X axis in the plane of the printing medium M as it faces a print head 25 (to be described later). The +Y direction is a direction in which the print medium M is fed out. The −Y direction is a direction opposite to the direction in which the print medium M is fed. The Z axis is an axis perpendicular to the X axis and to the Y axis. The +Z direction is a direction upward from the surface on which the printing device 11 is installed. The −Z direction is a direction from above the printing device 11 to below the printing device 11.

The printing device 11 shown in FIG. 1 performs printing on the printing medium M drawn out from a roll body RL. The printing device 11 is a large format printer capable of performing serial printing on a print medium M having a width equal to or greater than the A3 short side width. The A3 short side width is 297 mm. The printing device 11 may be a small-sized printer that performs serial printing on the print medium M having a width smaller than the A3 short side width. The printing device 11 includes a support stand 12, an outer housing 14, and a feed unit 15.

The support stand 12 supports the outer housing 14. The support stand 12 is disposed at a position in the −Z direction of the outer housing 14. The support stand 12 shown in FIG.

1 is composed of two legs, but is not limited thereto. The support stand 12 has a plurality of casters 13.

The casters 13 are disposed at a position in the −Z direction of the support stand 12. The casters 13 are in contact with the installation surface and movably support the support stand 12 and the outer housing 14. The support stand 12 shown in FIG. 1 has the casters 13, but may not have them.

The outer housing 14 accommodates various units such as a carriage 24, a print head 25, and a transport roller pair 26. The interior of the outer housing 14 is configured to be capable of transporting the print medium M. The outer housing 14 is supported by the support stand 12. The outer housing 14 is formed in a substantially rectangular parallelepiped shape. The outer housing 14 has a first housing side section 14A, a second housing side section 14B, and a housing upper surface 14C. The outer housing 14 corresponds to an example of a housing.

The first housing side section 14A is the −X direction part of the outer housing 14. The first housing side section 14A is provided at a position further in the −X direction than the transport path along which the print medium M is transported. The first housing side section 14A houses a blower fan 41 (to be described later).

The second housing side section 14B is the +X direction part of the outer housing 14. The second housing side section 14B is provided at a position further in the +X direction than the transport path along which the print medium M is transported. The second housing side section 14B is configured to be able to accommodate a second blower fan 43 (to be described later).

The housing upper surface 14C is provided at a position in the +Z direction of the outer housing 14. The housing upper surface 14C is provided at a position to cover the print medium M transported in the outer housing 14. The housing upper surface 14C is formed in a flat plate shape. The housing upper surface 14C is configured such that a work instrument such as a mobile computer can be placed on it.

The feed unit 15 feeds the printing medium M wound on the roll body RL into the outer housing 14. The feed unit 15 is disposed at a position in the −Y direction of the outer housing 14. The feed unit 15 has a drive mechanism 15A for rotating the roll body RL, a support member 15B for supporting the roll body RL, and the like. The drive mechanism 15A and the support member 15B will be described later. The feed unit 15 arranges at least a part of the roll body RL at a position further in the +Z direction than, that is, above, the housing upper surface 14C. Since at least a part of the roll body RL is arranged at a position further in the +Z direction than the housing upper surface 14C, the user can easily access the roll body RL from a position in the +Y direction of the printing device 11.

The roll body RL is wound around with the printing medium M in a cylindrical shape. The printing medium M is composed of elongated paper or elongated cloth. The roll body RL may have an axial center. The roll body RL is rotatably supported by the support member 15B. When the roll body RL is rotated by the drive mechanism 15A, the print medium M is drawn out. The roll body RL corresponds to an example of a roll.

The feed unit 15 is provided with a roll cover 16. The roll cover 16 covers the roll body RL supported by the feed unit 15. The roll cover 16 is provided at a position in the +Z direction from the roll body RL. The printing device 11 shown in FIG. 1 includes the roll cover 16, but is not limited thereto. The roll cover 16 may not be provided.

The print medium M drawn out from the roll body RL is transported in the +Y direction. The print medium M is transported into the outer housing 14 by a transport unit provided in the outer housing 14. The print medium M is transported in the +Y direction and in the −Z direction. The print medium M is transported in the outer housing 14 and discharged from the discharge port 18.

The discharge port 18 is an opening for discharging the print medium M transported in the outer housing 14 to the outside. The discharge port 18 is provided on the +Y direction surface of the outer housing 14. The discharge port 18 discharges the printing medium M printed on by the printing unit 23. The print medium M discharged from the discharge port 18 is sent to a medium receiving unit 19.

The medium receiving unit 19 receives the print medium M discharged from the discharge port 18. The medium receiving unit 19 is provided at a position in the +Y direction of the outer housing 14. The medium receiving unit 19 receives the print medium M at a position in the −Z direction of the discharge port 18. The printing device 11 may have a roll winding unit instead of the medium receiving unit 19. The roll winding unit winds up the printing medium M discharged from the discharge port 18 into a roll shape.

A cutting unit may be provided between the discharge port 18 and the medium receiving unit 19. The cutting unit cuts the printing medium M discharged from the discharge port 18 into a predetermined length. The cutting unit cuts the print medium M along the X-axis. The cut print medium M is received by the medium receiving unit 19.

A heating unit may be provided between the discharge port 18 and the medium receiving unit 19. The heating unit heats the printing medium M that was printed on by the printing unit 23. The heating unit dries the printing medium M by heating the printed printing medium M.

The printing device 11 includes an operation panel 20 and a liquid accommodation unit 21. The printing device 11 shown in FIG. 1 includes an operation panel 20 and a liquid accommodation unit 21 in a first housing side section 14A. The positions where the operation panel 20 and the liquid accommodation unit 21 are provided are not limited to the first housing side section 14A. The positions at which the operation panel 20 and the liquid accommodation unit 21 are provided are appropriately set.

The operation panel 20 receives a setting operation, an input operation, and the like by a user. The operation panel 20 has a display panel, operation buttons, and the like. The display panel displays a menu screen, various messages for informing the user of an operation state, and the like. When the display panel is constituted by a touch panel for receiving touch input, the operation buttons may not be provided.

The liquid accommodation unit 21 stores ink and the like to be supplied to the printing unit 23. The liquid accommodation unit 21 supports a plurality of liquid containers 22. The liquid accommodation unit 21 may detachably support the liquid containers 22. The liquid accommodation unit 21 shown in FIG. 1 supports four liquid containers 22, but is not limited to this. The liquid accommodation unit 21 supports one or more liquid containers 22.

The liquid containers 22 store ink and the like. The plurality of liquid containers 22 store, for example, inks of different colors. The plurality of liquid containers 22 store cyan ink, magenta ink, yellow ink, and black ink. The plurality of liquid containers 22 may store inks of the same color. The liquid containers 22 may store a coating liquid other than ink. The liquid containers 22 are configured by ink cartridges or ink tanks. When the liquid containers 22 are configured by ink cartridges, the ink cartridges are configured to be detachable. When the liquid containers 22 are configured by ink tanks, the ink tanks are configured to be refillable with ink.

The printing unit 23 is provided inside the outer housing 14. The printing unit 23 is supplied with ink or the like from the liquid containers 22. Ink or the like is supplied to the printing unit 23 from the liquid containers 22 through tubes provided between the printing unit 23 and the liquid containers 22. The tubes are not shown. The printing unit 23 uses the supplied ink to print on the print medium M transported along the Y axis. The printing unit 23 prints the printing medium M by ejecting ink onto the printing medium M. The printing unit 23 corresponds to an example of a liquid ejection section. The printing unit 23 includes a carriage 24 and a print head 25.

The carriage 24 transports the print head 25 along the X-axis. The carriage 24 supports the print head 25 such that the print head 25 can be transported along the X-axis at a transport width equal to or greater than the medium width of the print medium M. The carriage 24 is driven by a carriage drive mechanism (not shown) so as to be capable of reciprocating across the transport width.

The print head 25 prints on the print medium M by ejecting ink onto the print medium M. The print head 25 is disposed at a position in the +Z direction of the print medium M. The print head 25 prints on the print medium M transported along the Y axis. The print head 25 is supported by the carriage 24 at a position facing the print medium M. The print head 25 ejects ink as the carriage 24 moves along the X-axis to print on the print medium M.

The printing device 11 shown in FIG. 1 is an off-carriage type in which the liquid accommodation unit 21 is attached to the outer housing 14. The printing device 11 is not limited to an off-carriage type. The printing device 11 may be an on-carriage type in which the plurality of liquid containers 22 are provided on a carriage 24.

The printing device 11 includes a control unit 100 for controlling the printing unit 23 and the like. The control unit 100 controls the printing unit 23 and the like based on the print data received from the host computer or the like or print instructions instructed through operation of the operation panel 20. The control unit 100 is a controller circuit for controlling various units. The control unit 100 is, for example, a processor having a Central Processing Unit (CPU). The control unit 100 is composed of one or a plurality of processors. The control unit 100 may have a semiconductor memory such as a Read Only Memory (ROM) or a Random Access Memory (RAM).

First Embodiment

The first embodiment shows the printing device 11 provided with one blower fan 41. The blower fan 41 blows air into the printing device 11. The printing device 11 removes ink mist, dust, and the like from inside the printing device 11 by air blown in by the blower fan 41. Alternatively, the printing device 11 cools the printing medium M, the electric circuitry, and the like by air blown in by the blower fan 41.

Figure 2:
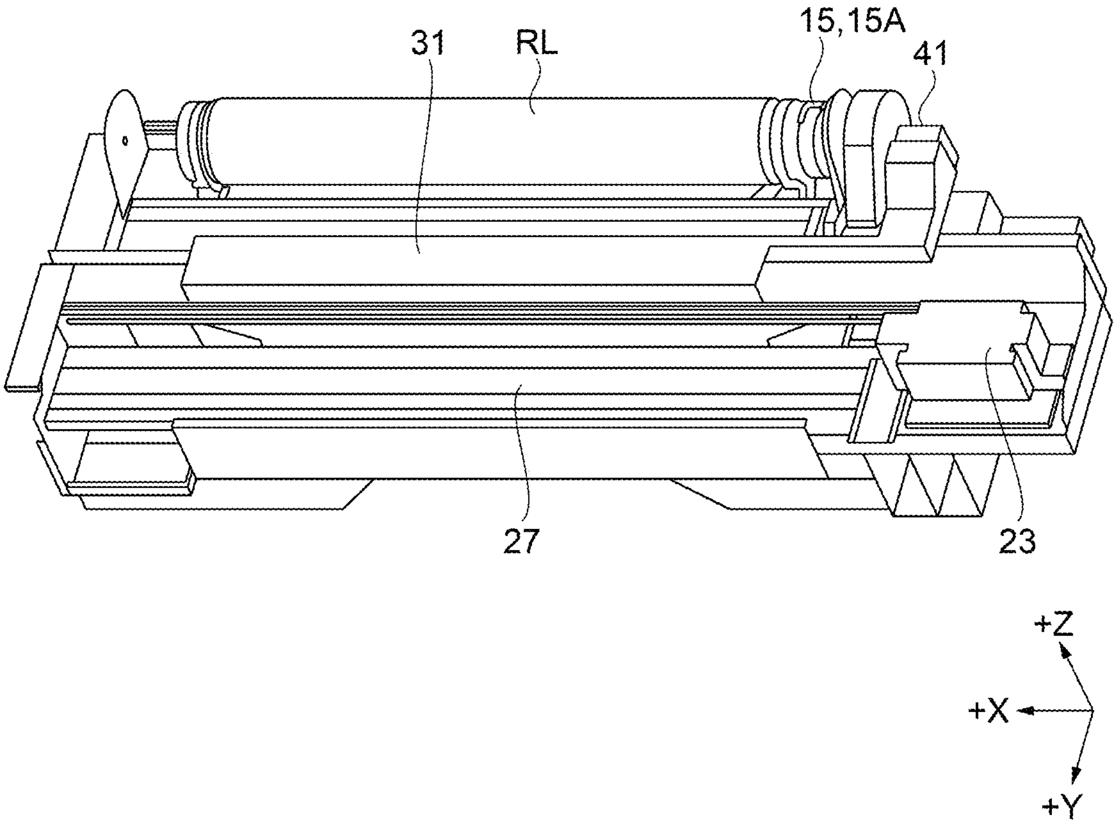
FIG. 2 is a diagram showing schematic configuration of the printing device.

FIG. 2 shows configuration of the printing device 11. FIG. 2 is a perspective view of the printing device 11 in a state where the outer housing 14 and the roll cover 16 are removed. FIG. 2 shows the interior of the outer housing 14 and the interior of the feed unit 15. FIG. 2 shows a state in which the roll body RL is supported by the feed unit 15. FIG. 2 shows the drive mechanism 15A, the printing unit 23, a platen 27, an air duct 31, and the blower fan 41.

The drive mechanism 15A is provided in the feed unit 15. The drive mechanism 15A is provided at a position in the −X direction of the roll body RL. The drive mechanism 15A transmits a rotational force to the support member 15B, which supports the roll body RL. The drive mechanism 15A rotates the roll body RL by rotational force. The print medium M is fed into the outer housing 14 by the roll body RL being rotated by rotational force of the drive mechanism 15A.

The printing unit 23 shown in FIG. 2 is disposed at the home position, which is the −X direction end position of the printing device 11. The printing unit 23 is located outside the medium width of the printing medium M. When the printing unit 23 is located at the home position, it is possible to perform a maintenance process such as flushing. The printing unit 23 stands by at the home position.

The platen 27 supports the printing medium M transported along the Y axis. The platen 27 is disposed at a position facing the print head 25 of the printing unit 23. The platen 27 supports the print medium M while the print head 25 is printing on the print medium M. The platen 27 may be coupled to a suction mechanism (not shown) and the printing medium M may be sucked by the suction mechanism.

The air duct 31 forms an airflow path 33 for guiding air to a feed port 34. Details of the airflow path 33 will be described later. The air duct 31 is disposed at a position in the +Z direction of the printing medium M that is transported inside of the outer housing 14. The air duct 31 circulates air along the X-axis. The air duct 31 is coupled to the blower fan 41. The air duct 31 corresponds to an example of a flow path member.

The blower fan 41 feeds air into the air duct 31. The blower fan 41 is disposed at a position further in the −X direction than is the transport path along which the print medium M is transported. The blower fan 41 is disposed in a first housing side section 14A, which is an end section of the outer housing 14 along the X-axis. The blower fan 41 corresponds to an example of a fan.

Figure 3:
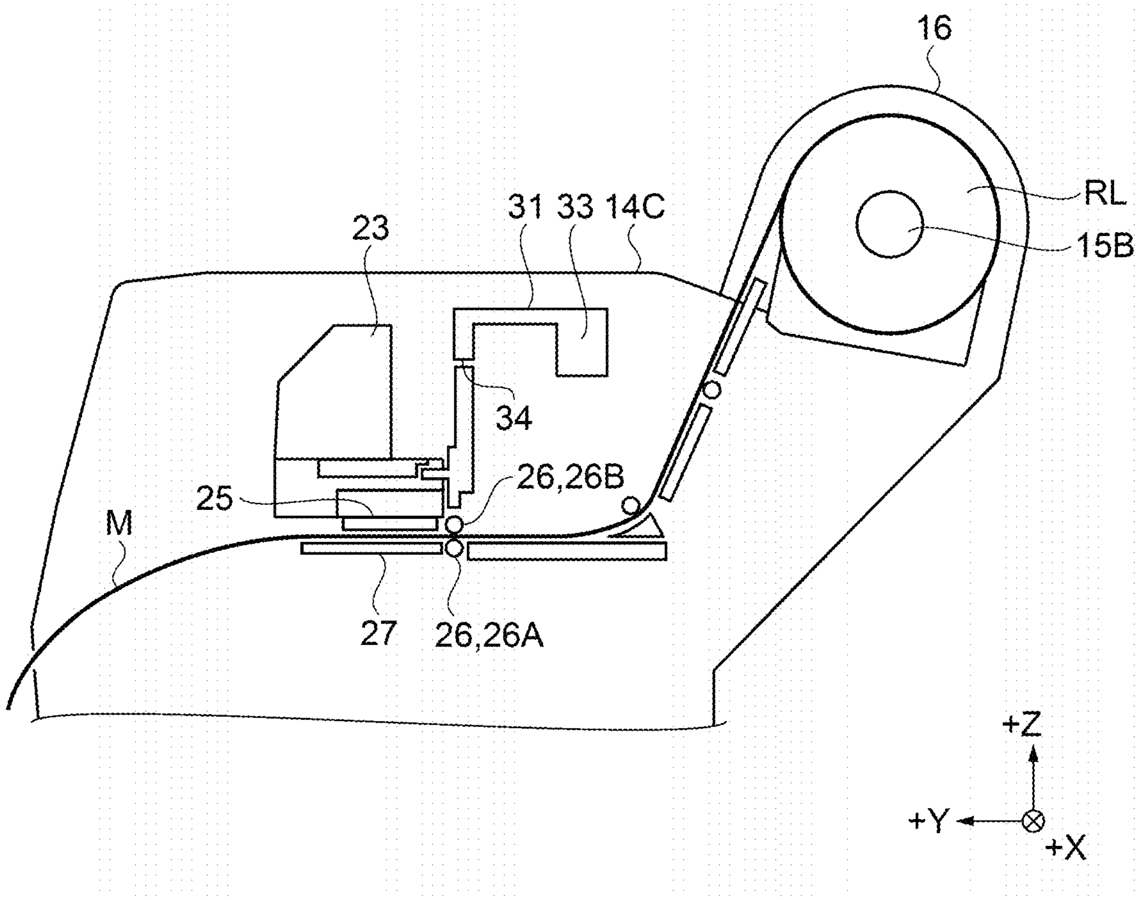
FIG. 3 is a diagram showing schematic configuration of the printing device.

FIG. 3 shows schematic configuration of the printing device 11. FIG. 3 schematically shows the part of the printing device 11 in which the printing medium M is transported. FIG. 3 shows the print medium M that was fed out from the roll body RL. FIG. 3 shows a Y-Z cross section of the printing device 11. FIG. 3 shows the support member 15B, the printing unit 23, the transport roller pair 26, the platen 27, the air duct 31, and the like.

The support member 15B supports the roll body RL. The support member 15B constitutes a part of the feed unit 15. The support member 15B shown in FIG. 3 is constituted by a shaft passing through the center of the roll body RL, but is not limited thereto. The support member 15B may be configured to support the +X direction end section and the −X direction end section of the roll body RL. The support member 15B rotatably supports the roll body RL. The center of the support member 15B shown in FIG. 3 is arranged at a position further in the +Z direction than is the housing upper surface 14C. The support member 15B supports at least a part of the roll body RL at a position further in the +Z direction than the housing upper surface 14C. The user can easily access the roll body RL from the +Y direction, which is the front of the printing device 11. The support member 15B corresponds to an example of a roll support member.

The transport roller pair 26 transports the printing medium M along the Y axis. The transport roller pair 26 transports the printing medium M toward a printing position, where the print head 25 and the platen 27 face each other through the printing medium M. The transport roller pair 26 is disposed at a position in the −Y direction of the platen 27. The transport roller pair 26 includes a first transport roller 26A and a second transport roller 26B. The Y-axis corresponds to an example of a first axis. The transport roller pair 26 corresponds to an example of a transport section.

The first transport roller 26A is a driving roller for transporting the printing medium M. The first transport roller 26A is coupled to a roller drive mechanism (not shown). The first transport roller 26A is rotated by the drive of the roller drive mechanism. The first transport roller 26A rotates to transport the printing medium M in the +Y direction along the Y axis. The first transport roller 26A is disposed at a position in the −Z direction of the printing medium M and contacts the printing medium M.

The second transport roller 26B is a driven roller for nipping the printing medium M with the first transport roller 26A. The second transport roller 26B follows the transport of the printing medium M. The second transport roller 26B is disposed at a position in the +Z direction of the printing medium M.

The transport roller pair 26 is composed of the first transport roller 26A as a drive roller and the second transport roller 26B as a driven roller, but is not limited thereto. The first transport roller 26A may be a driven roller, and the second transport roller 26B may be a drive roller.

The air duct 31 is disposed between the housing upper surface 14C and the transport path of the printing medium M. The air duct 31 is disposed at a position in the −Y direction of the printing unit 23. The air duct 31 feeds air toward the print medium M before the print medium M is printed on by the print head 25. The air duct 31 includes an airflow path 33 and a feed port 34.

The airflow path 33 is formed inside the air duct 31. The airflow path 33 is a passage for circulating the air feed by the blower fan 41 toward the feed port 34. The airflow path 33 guides the air in the +X direction and the +Y direction. The airflow path 33 corresponds to an example of a path.

The feed port 34 is a path opening for feeding the air flowing through the airflow path 33 toward the printing medium M. The feed port 34 feeds air toward the −Z direction. The feed port 34 feeds air at a predetermined flow rate distribution with respect to the medium width, which is along the X-axis. Air is fed from the feed port 34 to the first surface of the printing medium M in the +Z direction. The air that has reached the first surface of the printing medium M is discharged along the first surface to outside the outer housing 14. The air flowing in the outer housing 14 discharges mist, dust, and the like in the outer housing 14 to outside the printing device 11. The air flowing in the outer housing 14 may cool electric circuitry in the printing unit 23, the printing medium M, and other circuitry. The feed port 34 corresponds to an example of an opening.

Figure 4:
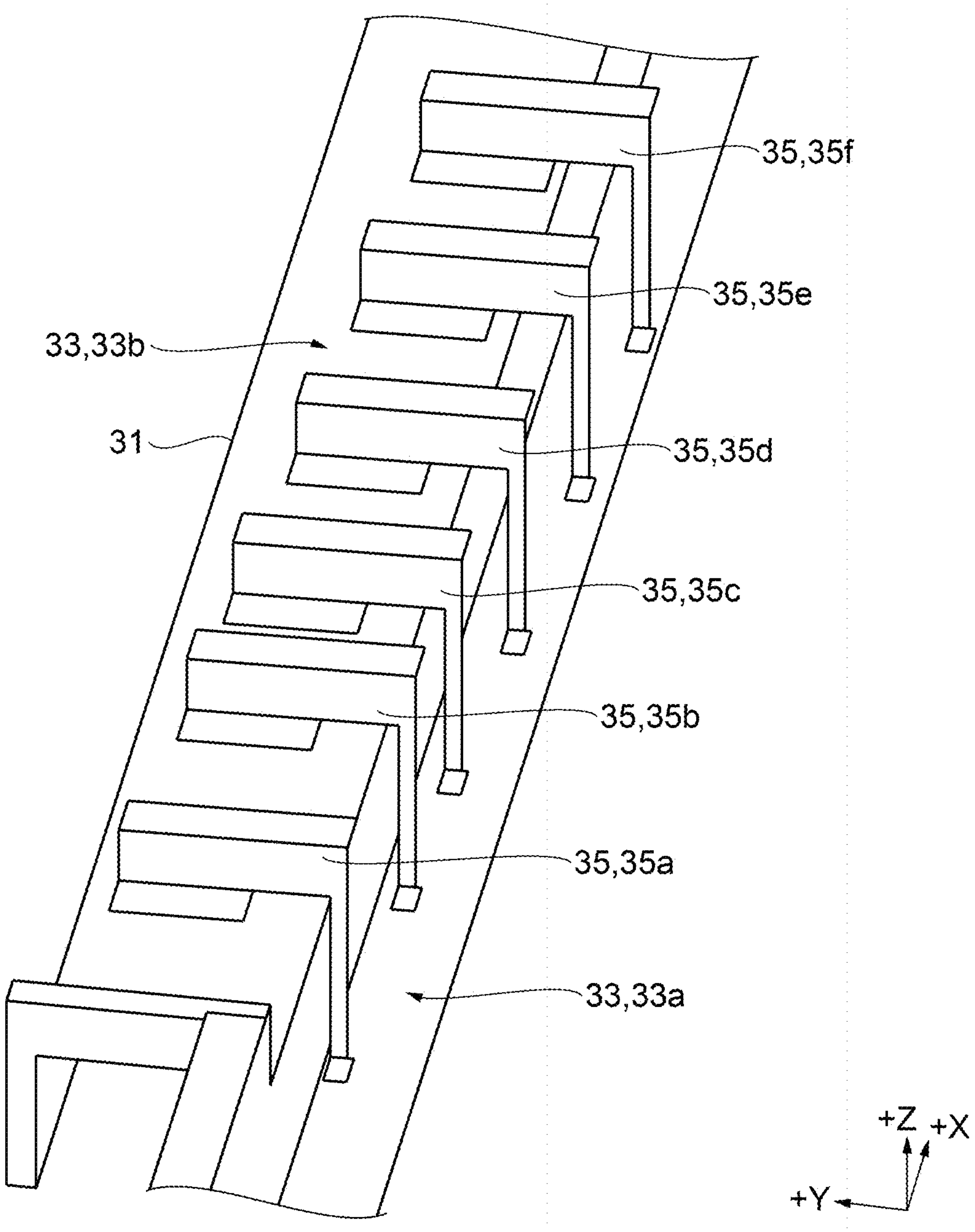
FIG. 4 is a view showing schematic configuration of an air duct.

FIG. 4 shows schematic configuration of the air duct 31. FIG. 4 is a perspective view of the inside of the air duct 31. FIG. 4 shows schematic configuration of the airflow path 33 in the air duct 31. A plurality of flow path plates 35 are arranged in the airflow path 33.

The airflow path 33 constitutes a path that is wider than the medium width along the X-axis and air flows through it. The airflow path 33 is composed of a first airflow path 33*a* and a second airflow path 33*b* having different heights along the Z-axis.

The first airflow path 33*a* is a path through which air sent from the blower fan 41 flows. The first airflow path 33*a* is coupled to the blower fan 41 through a third airflow path 33*c* (to be described later). The first airflow path 33*a* guides the air in the +X direction along the X axis. The X-axis corresponds to an example of a second axis. The first airflow path 33*a* corresponds to an example of a first flow path section.

The second airflow path 33*b* is a path through which flows air that has flowed through the first airflow path 33*a*. The second airflow path 33*b* guides the air toward the feed port 34. Air flows through the second airflow path 33*b* in the +Y direction along the Y axis. The second airflow path 33*b* corresponds to an example of a second flow path section.

The flow path plates 35 function as barriers for changing the direction in which air flows. The flow path plates 35 change the flow direction of the air flowing through the first airflow path 33*a* from the +X direction to the +Y direction. The flow path plates 35 guide the air flowing through the first airflow path 33*a* to the second airflow path 33*b*. The flow path plates 35 are disposed in the first airflow path 33*a* and in the second airflow path 33*b*. The flow path plates 35 shown in FIG. 4 are formed in an L-shape, but are not limited to this. The configuration of the flow path plates 35 is not limited as long as they are configured to guide the air flowing through the first airflow path 33*a* to the second airflow path 33*b*. The flow path plates 35 correspond to an example of a partition plate.

The plurality of flow path plates 35 are arranged in the airflow path 33. Six flow path plates 35 are arranged in the airflow path 33 shown in FIG. 4, that is, a first flow path plate 35*a*, a second flow path plate 35*b*, a third flow path plate 35*c*, a fourth flow path plate 35*d*, a fifth flow path plate 35*e*, and a sixth flow path plate 35*f*. The number of the flow path plates 35 is not limited to six. The number of the flow path plates 35 is appropriately set to two or more. By arranging the plurality of flow path plates 35, air can be fed to the printing medium M with a predetermined flow rate distribution with respect to the medium width. Any two of the first flow path plate 35*a*, the second flow path plate 35*b*, the third flow path plate 35*c*, the fourth flow path plate 35*d*, the fifth flow path plate 35*e*, and the sixth flow path plate 35*f* correspond to an example of a first partition plate and a second partition plate.

Among the plurality of flow path plates 35, the first flow path plate 35*a* is disposed at a position that is furthest in the −X direction. The first flow path plate 35*a* causes the air that was fed from the −X direction along the X axis of the first airflow path 33*a* to flow toward the second airflow path 33*b*. The first flow path plate 35*a* guides the air flowing through the second airflow path 33*b* toward the feed port 34.

The second flow path plate 35*b* is disposed at a position in the +X direction from the first flow path plate 35*a*. The second flow path plate 35*b* causes the air that passed by the first flow path plate 35*a* and that is flowing through the first airflow path 33*a* to flow toward the second airflow path 33*b*. The second flow path plate 35*b* causes the air that was fed from the −X direction along the X axis of the first airflow path 33*a* to flow toward the second airflow path 33*b*. The second flow path plate 35*b* guides the air flowing through the second airflow path 33*b* toward the feed port 34.

The third flow path plate 35*c* is disposed at a position in the +X direction from the second flow path plate 35*b*. The third flow path plate 35*c* causes the air that passed by the second flow path plate 35*b* and that is flowing through the first airflow path 33*a* to flow toward the second airflow path 33*b*. The third flow path plate 35*c* causes the air that was fed from the −X direction along the X axis of the first airflow path 33*a* to flow toward the second airflow path 33*b*. The third flow path plate 35*c* guides the air flowing through the second airflow path 33*b* toward the feed port 34.

The fourth flow path plate 35*d* is disposed at a position in the +X direction from the third flow path plate 35*c*. The fourth flow path plate 35*d* causes the air that passed by the third flow path plate 35*c* and that is flowing through the first airflow path 33*a* to flow toward the second airflow path 33*b*. The fourth flow path plate 35*d* causes the air that was fed from the −X direction along the X axis of the first airflow path 33*a* to flow toward the second airflow path 33*b*. The fourth flow path plate 35*d* guides the air flowing through the second airflow path 33*b* toward the feed port 34.

The fifth flow path plate 35*e* is disposed at a position in the +X direction from the fourth flow path plate 35*d*. The fifth flow path plate 35*e* causes the air that passed by the fourth flow path plate 35*d* and that is flowing through the first airflow path 33*a* to flow toward the second airflow path 33*b*. The fifth flow path plate 35*e* causes the air that was fed from the −X direction along the X axis of the first airflow path 33*a* to flow toward the second airflow path 33*b*. The fifth flow path plate 35*e* guides the air flowing through the second airflow path 33*b* toward the feed port 34.

The sixth flow path plate 35*f* is disposed at a position in the +X direction from the fifth flow path plate 35*e*. The sixth flow path plate 35*f* causes the air that passed by the fifth flow path plate 35*e* and that is flowing through the first airflow path 33*a* to flow toward the second airflow path 33*b*. The sixth flow path plate 35*f* causes the air that was fed from the −X direction along the X axis of the first airflow path 33*a* to flow toward the second airflow path 33*b*. The sixth flow path plate 35*f* guides the air flowing through the second airflow path 33*b* toward the feed port 34.

Figure 5:
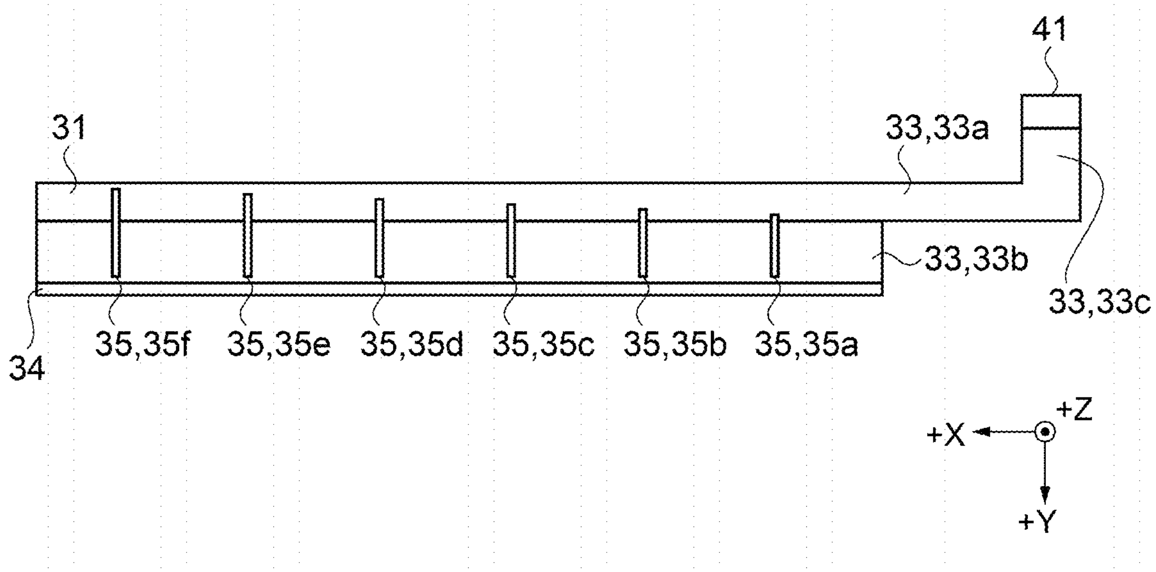
FIG. 5 is a diagram showing an example of schematic configuration of an airflow path.

FIG. 5 shows an example of schematic configuration of the airflow path 33. FIG. 5 shows an example of the arrangement and configuration of the plurality of flow path plates 35. FIG. 5 shows an X-Y cross section of the airflow path 33 as viewed from the +Z direction. The airflow path 33 is formed by the air duct 31 and the plurality of flow path plates 35. The airflow path 33 includes the first airflow path 33*a* and the second airflow path 33*b*. The air duct 31 has the feed port 34 on its −Z direction surface. The air duct 31 is coupled to the blower fan 41.

The feed port 34 is a slit for discharging the air flowing through the airflow path 33 in the −Z direction. The feed port 34 feeds air with an opening width along the X-axis. The feed port 34 shown in FIG. 5 is formed by a single slit having an opening width along the X-axis. The structure of the feed port 34 is not limited to a single slit. The feed port 34 may be constituted by a plurality of slits arranged along the X axis, nozzle holes arranged along the X axis, or the like. The opening width is desirably equal to or larger than the medium width of the printing medium M.

The blower fan 41 is disposed at an end section of the air duct 31 in the −X direction. The blower fan 41 shown in FIG. 5 is arranged facing the −Y direction. The blower fan 41 causes the air to flow from the −Y direction to the +Y direction and feeds the air into the airflow path 33 in the air duct 31. The direction of the blower fan 41 is not limited to the configuration shown in FIG. 5. The blower fan 41 may be arranged in the −X direction. The blower fan 41 circulates the air in the +X direction, and feeds the air into the airflow path 33 in the air duct 31.

The airflow path 33 includes the first airflow path 33*a*, the second airflow path 33*b*, and the third airflow path 33*c*. The airflow path 33 is shown divided into the first airflow path 33*a*, the second airflow path 33*b*, and the third airflow path 33*c*, but is not limited thereto. When the blower fan 41 is arranged facing the −X direction, the third airflow path 33*c* may not be provided. The third airflow path 33*c* is a path connecting the first airflow path 33*a* and the blower fan 41. The third airflow path 33*c* is formed between the first airflow path 33*a* and the blower fan 41. The third airflow path 33*c* causes the air that the blower fan 41 fed into the air duct 31 to flow into the first airflow path 33*a*. The first airflow path 33*a* circulates the air that was fed from the blower fan 41 through the third airflow path 33*c* in the +X direction along the X axis.

The first flow path plate 35*a*, the second flow path plate 35*b*, the third flow path plate 35*c*, the fourth flow path plate 35*d*, the fifth flow path plate 35*e*, and the sixth flow path plate 35*f* shown in FIG. 5 have different shapes from each other. The first flow path plate 35*a*, the second flow path plate 35*b*, the third flow path plate 35*c*, the fourth flow path plate 35*d*, the fifth flow path plate 35*e*, and the sixth flow path plate 35*f* have different lengths from each other along the Y axis.

Among the plurality of flow path plates 35, the first flow path plate 35*a* is disposed at a position closest to the blower fan 41. Among the plurality of flow path plates 35, the first flow path plate 35*a* is configured to have the shortest length along the Y axis. The first protrusion amount d1 of the first flow path plate 35*a* into the first airflow path 33*a* is smaller than the protrusion amounts of the other flow path plates 35 into the first airflow path 33*a*. The first protrusion amount d1 and the like will be described later.

The second flow path plate 35*b* is disposed at a position further in the +X direction than is the first flow path plate 35*a*. The first flow path plate 35*a* is disposed at a position closer to the blower fan 41 than is the second flow path plate 35*b*. The second flow path plate 35*b* has shape with a length that is longer along the Y axis than the first flow path plate 35*a*. The second protrusion amount d2 of the second flow path plate 35*b* into the first airflow path 33*a* is larger than the first protrusion amount d1 of the first flow path plate 35*a* into the first airflow path 33*a*.

The third flow path plate 35*c* is disposed at a position further in the +X direction than are the first flow path plate 35*a* and the second flow path plate 35*b*. The first flow path plate 35*a* and the second flow path plate 35*b* are disposed at positions closer to the blower fan 41 than is the third flow path plate 35*c*. The third flow path plate 35*c* has a shape with a length that is longer along the Y-axis than the first flow path plate 35*a* and the second flow path plate 35*b*. The third protrusion amount d3 of the third flow path plate 35*c* into the first airflow path 33*a* is larger than the first protrusion amount d1 and the second protrusion amount d2.

The fourth flow path plate 35*d* is disposed at a position further in the +X direction than the first flow path plate 35*a*, the second flow path plate 35*b*, and the third flow path plate 35*c*. The first flow path plate 35*a*, the second flow path plate 35*b*, and the third flow path plate 35*c* are disposed at positions closer to the blower fan 41 than is the fourth flow path plate 35*d*. The fourth flow path plate 35*d* has a shape with a length that is longer along the Y-axis than the first flow path plate 35*a*, the second flow path plate 35*b*, and the third flow path plate 35*c*. The fourth protrusion amount d4 of the fourth flow path plate 35*d* into the first airflow path 33*a* is larger than the first protrusion amount d1, the second protrusion amount d2, and the third protrusion amount d3.

The fifth flow path plate 35*e* is disposed at a position further in the +X direction than are the first flow path plate 35*a*, the second flow path plate 35*b*, the third flow path plate 35*c*, and the fourth flow path plate 35*d*. The first flow path plate 35*a*, the second flow path plate 35*b*, the third flow path plate 35*c*, and the fourth flow path plate 35*d* are disposed at positions closer to the blower fan 41 than is the fifth flow path plate 35*e*. The fifth flow path plate 35*e* has a shape with a length that is longer along the Y axis than the first flow path plate 35*a*, the second flow path plate 35*b*, the third flow path plate 35*c*, and the fourth flow path plate 35*d*. The fifth protrusion amount d5 of the fifth flow path plate 35*e* into the first airflow path 33*a* is larger than the first protrusion amount d1, the second protrusion amount d2, the third protrusion amount d3, and the fourth protrusion amount d4.

The sixth flow path plate 35*f* is disposed at a position further in the +X direction than are the first flow path plate 35*a*, the second flow path plate 35*b*, the third flow path plate 35*c*, the fourth flow path plate 35*d*, and the fifth flow path plate 35*e*. The first flow path plate 35*a*, the second flow path plate 35*b*, the third flow path plate 35*c*, the fourth flow path plate 35*d*, and the fifth flow path plate 35*e* are disposed at positions closer to the blower fan 41 than is the sixth flow path plate 35*f*. The sixth flow path plate 35*f* has a shape with a length that is longer along the Y-axis than the first flow path plate 35*a*, the second flow path plate 35*b*, the third flow path plate 35*c*, the fourth flow path plate 35*d*, and the fifth flow path plate 35*e*. The sixth protrusion amount d6 of the sixth flow path plate 35*f* into the first airflow path 33*a* is larger than the first protrusion amount d1, the second protrusion amount d2, the third protrusion amount d3, the fourth protrusion amount d4, and the fifth protrusion amount d5.

By arranging the plurality of flow path plates 35 in the airflow path 33 at predetermined intervals along the X-axis, the flow rate distribution of the air fed from the feed port 34 along the X-axis can be adjusted to a predetermined distribution. By arranging the plurality of flow path plates 35 shown in FIG. 5, the difference between the flow rate of air fed from the −X direction end section of the feed port 34 and the flow rate of the air fed from the +X direction end section of the feed port 34 is reduced.

Figure 6:
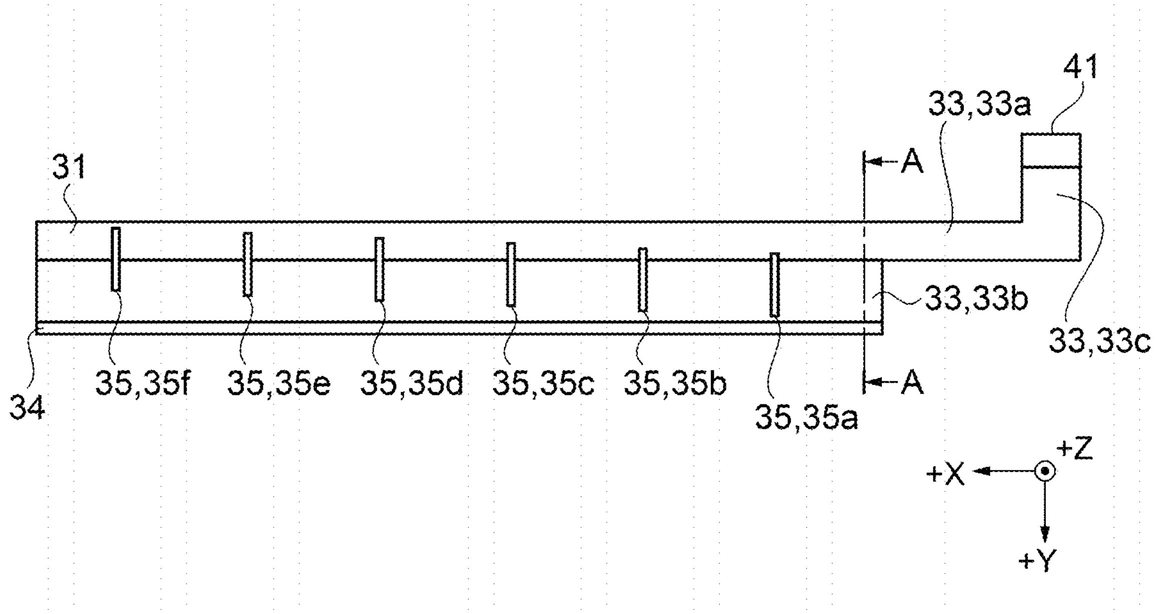
FIG. 6 is a diagram showing an example of schematic configuration of the airflow path.

FIG. 6 shows an example of schematic configuration of the airflow path 33. FIG. 6 shows an example of the arrangement and configuration of the plurality of flow path plates 35. FIG. 6 shows an X-Y cross section of the airflow path 33 as viewed from the +Z direction. FIG. 6 shows schematic configuration of an airflow path 33 that is different from the airflow path 33 shown in FIG. 5. The airflow path 33 is formed by the air duct 31 and the plurality of flow path plates 35. The airflow path 33 includes the first airflow path 33*a* and the second airflow path 33*b*. The air duct 31 is coupled to the blower fan 41. The blower fan 41 shown in FIG. 6 has the same configuration as the blower fan 41 shown in FIG. 5.

The airflow path 33 includes the first airflow path 33*a*, the second airflow path 33*b*, and the third airflow path 33*c*. The first airflow path 33*a*, the second airflow path 33*b*, and the third airflow path 33*c* shown in FIG. 6 have the same configurations as the first airflow path 33*a*, the second airflow path 33*b*, and the third airflow path 33*c* shown in FIG. 5.

The first flow path plate 35*a*, the second flow path plate 35*b*, the third flow path plate 35*c*, the fourth flow path plate 35*d*, the fifth flow path plate 35*e*, and the sixth flow path plate 35*f* shown in FIG. 6 are configured in the same shape. The plurality of flow path plates 35 are arranged at different positions along the Y axis. Since the positions along the Y axis are different, the protrusion amounts of the plurality of flow path plates 35 into the first airflow path 33*a* are different.

Among the plurality of flow path plates 35, the first flow path plate 35*a* is disposed at a position closest to the blower fan 41. Among the plurality of flow path plates 35, the first flow path plate 35*a* is disposed at a position that is furthest in the +Y direction and that is closest to the feed port 34. The first protrusion amount d1 of the first flow path plate 35*a* into the first airflow path 33*a* is smaller than the protrusion amounts of the other flow path plates 35 into the first airflow path 33*a*.

The second flow path plate 35*b* is disposed at a position further in the +X direction than is the first flow path plate 35*a*. The first flow path plate 35*a* is disposed at a position closer to the blower fan 41 than is the second flow path plate 35*b*. The second flow path plate 35*b* is located at a position that is further in the −Y direction than, and that is farther from the feed port 34 than, the first flow path plate 35*a*. The second protrusion amount d2 of the second flow path plate 35*b* into the first airflow path 33*a* is larger than the first protrusion amount d1 of the first flow path plate 35*a* into the first airflow path 33*a*.

The third flow path plate 35*c* is disposed at a position further in the +X direction than are the first flow path plate 35*a* and the second flow path plate 35*b*. The first flow path plate 35*a* and the second flow path plate 35*b* are disposed at positions closer to the blower fan 41 than is the third flow path plate 35*c*. The third flow path plate 35*c* is located at a position that is further in the −Y direction than, and that is farther from the feed port 34 than, are the first flow path plate 35*a* and the second flow path plate 35*b*. The third protrusion amount d3 of the third flow path plate 35*c* into the first airflow path 33*a* is larger than the first protrusion amount d1 and the second protrusion amount d2.

The fourth flow path plate 35*d* is disposed at a position further in the +X direction than the first flow path plate 35*a*, the second flow path plate 35*b*, and the third flow path plate 35*c*. The first flow path plate 35*a*, the second flow path plate 35*b*, and the third flow path plate 35*c* are disposed at positions closer to the blower fan 41 than is the fourth flow path plate 35*d*. The fourth flow path plate 35*d* is located at a position that is further in the −Y direction than, and that is farther from the feed port 34 than, are the first flow path plate 35*a*, the second flow path plate 35*b*, and the third flow path plate 35*c*. The fourth protrusion amount d4 of the fourth flow path plate 35*d* into the first airflow path 33*a* is larger than the first protrusion amount d1, the second protrusion amount d2, and the third protrusion amount d3.

The fifth flow path plate 35*e* is disposed at a position further in the +X direction than are the first flow path plate 35*a*, the second flow path plate 35*b*, the third flow path plate 35*c*, and the fourth flow path plate 35*d*. The first flow path plate 35*a*, the second flow path plate 35*b*, the third flow path plate 35*c*, and the fourth flow path plate 35*d* are disposed at positions closer to the blower fan 41 than is the fifth flow path plate 35*e*. The fifth flow path plate 35*e* is located at a position that is further in the −Y direction than, and that is farther from the feed port 34 than, are the first flow path plate 35*a*, the second flow path plate 35*b*, the third flow path plate 35*c*, and the fourth flow path plate 35*d*. The fifth protrusion amount d5 of the fifth flow path plate 35*e* into the first airflow path 33*a* is larger than the first protrusion amount d1, the second protrusion amount d2, the third protrusion amount d3, and the fourth protrusion amount d4.

The sixth flow path plate 35*f* is disposed at a position further in the +X direction than are the first flow path plate 35*a*, the second flow path plate 35*b*, the third flow path plate 35*c*, the fourth flow path plate 35*d*, and the fifth flow path plate 35*e*. The first flow path plate 35*a*, the second flow path plate 35*b*, the third flow path plate 35*c*, the fourth flow path plate 35*d*, and the fifth flow path plate 35*e* are disposed at positions closer to the blower fan 41 than is the sixth flow path plate 35*f*. The sixth flow path plate 35*f* is located at a position that is further in the −Y direction than, and that is farther from the feed port 34 than, are the first flow path plate 35*a*, the second flow path plate 35*b*, the third flow path plate 35*c*, the fourth flow path plate 35*d*, and the fifth flow path plate 35*e*. The sixth protrusion amount d6 of the sixth flow path plate 35*f* into the first airflow path 33*a* is larger than the first protrusion amount d1, the second protrusion amount d2, the third protrusion amount d3, the fourth protrusion amount d4, and the fifth protrusion amount d5.

Figure 7:
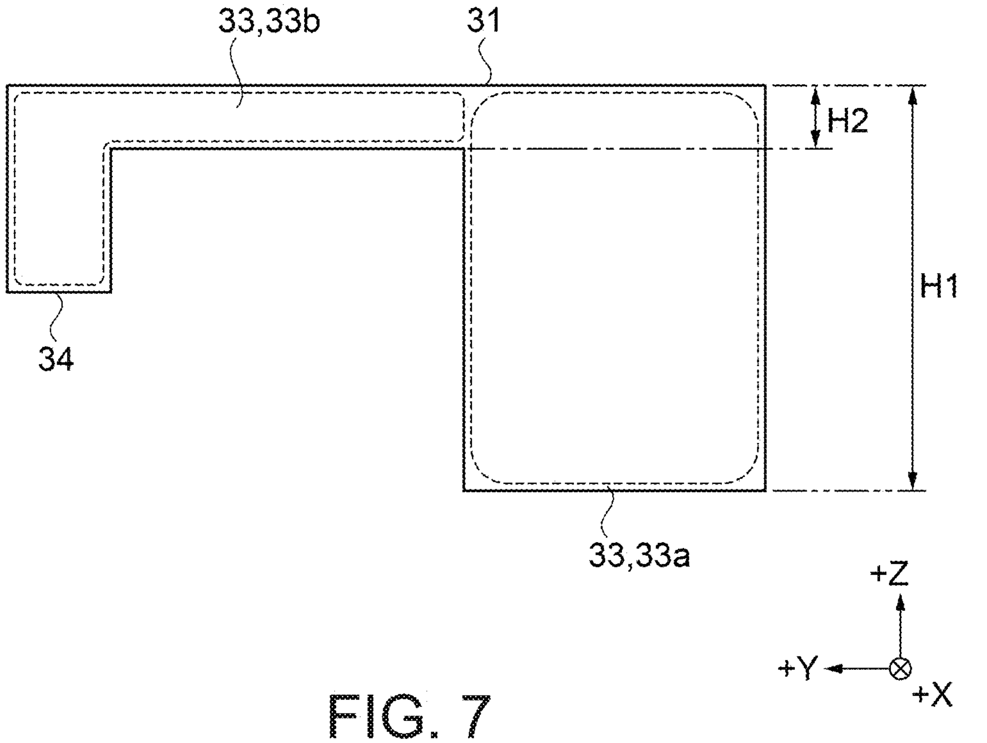
FIG. 7 is a view showing cross-sectional configuration of the air duct.

FIG. 7 shows cross-sectional configuration of the air duct 31. FIG. 7 shows a Y-Z cross section of the air duct 31. FIG. 7 shows a cross section taken along the line A-A shown in FIG. 6. In FIG. 7, the flow path plates 35 are omitted. The airflow path 33 is formed in the air duct 31. FIG. 7 shows the first airflow path 33*a* and the second airflow path 33*b*.

The first airflow path 33*a* is coupled to the third airflow path 33*c* shown in FIG. 6 at the −X direction end section. The Y-Z cross-sectional shape of the first airflow path 33*a* corresponds to the shape of the opening through which air flows at the connection section between the first airflow path 33*a* and the third airflow path 33*c*. The first airflow path 33*a* guides the air fed from the blower fan 41 in the +X direction. The first airflow path 33*a* has a first height H1 along the Z axis.

The second airflow path 33*b* is coupled to the first airflow path 33*a* at a position in the −Y direction. The second airflow path 33*b* guides the air toward the feed port 34 formed at a position in the +Y direction. The second airflow path 33*b* has a second height H2 along the Z axis.

The first height H1 is desirably higher than the second height H2. By the first height H1 being higher than the second height H2, the air duct 31 can increase the flow rate of air flowing in the +X direction along the X axis.

Figure 8:
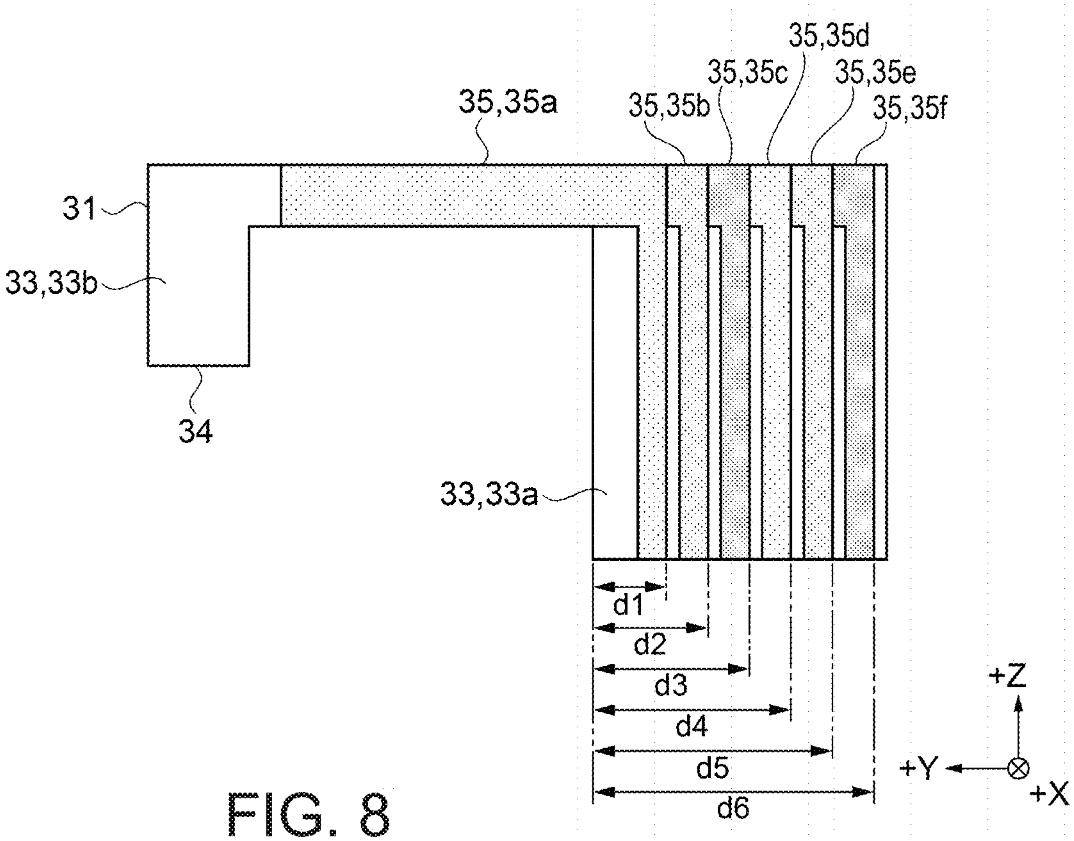
FIG. 8 is a view showing cross-sectional configuration of the air duct.

FIG. 8 shows cross-sectional configuration of the air duct 31. FIG. 8 shows a Y-Z cross section of the air duct 31. FIG. 8 shows a cross section taken along the line A-A shown in FIG. 6. FIG. 8 shows the plurality of flow path plates 35. FIG. 8 shows the first protrusion amount d1, the second protrusion amount d2, the third protrusion amount d3, the fourth protrusion amount d4, the fifth protrusion amount d5, and the sixth protrusion amount d6.

The protrusion amount indicates an amount by which a flow path plate 35 is inserted into the first airflow path 33*a*. The plurality of flow path plates 35 shown in FIG. 8 are formed in the same shape. The protrusion amount corresponds to the position where the flow path plate 35 is installed. When the installation position of a flow path plate 35 is moved to a position in the −Y direction, the protrusion amount increases. When the protrusion amount increases, the X-Y cross sectional area of the flow path plates 35 located in the first airflow path 33*a* increases. When the X-Y cross sectional area of a flow path plate 35 located in the first airflow path 33*a* increases, the flow rate of air flowing in the +X direction decreases and the flow rate of air flowing in the +Y direction increases. The flow rate of air guided toward the feed port 34 increases.

It is desirable that the first protrusion amount d1, the second protrusion amount d2, the third protrusion amount d3, the fourth protrusion amount d4, the fifth protrusion amount d5, and the sixth protrusion amount d6 are arranged in a relationship represented by the following equation (1).

$$d1 \leq d2 \leq d3 \leq d4 \leq d5 \leq d6 \quad (1)$$

By arranging the plurality of flow path plates 35 in the arrangement having the relationship shown in equation (1), the flow rate of air at the feed port 34 formed by the opening along the X axis becomes uniform or substantially uniform along the X axis. Here, "substantially uniform" means that the error of the air flow rate is within +5%.

Figure 9:
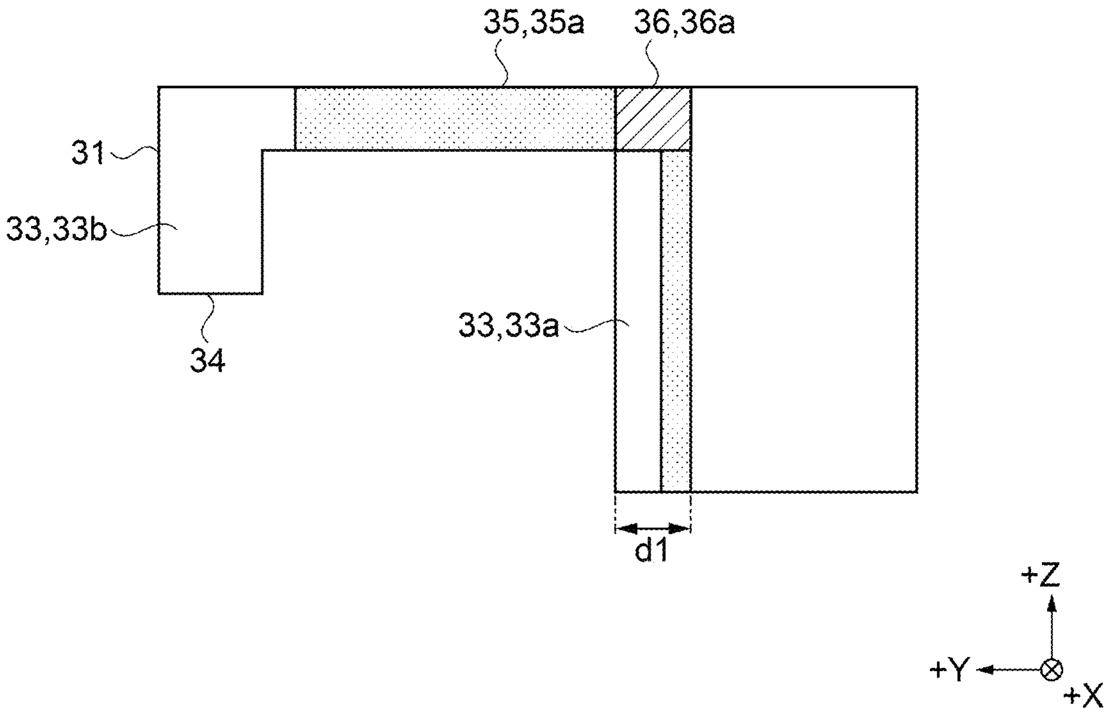
FIG. 9 is a view showing cross-sectional configuration of the air duct.

FIG. 9 shows cross-sectional configuration of the air duct 31. FIG. 9 shows a Y-Z cross section of the air duct 31. FIG. 9 shows a cross section taken along the line A-A shown in FIG. 6. In FIG. 9, the flow path plates 35 other than the first flow path plate 35*a* are omitted. The airflow path 33 is formed in the air duct 31. FIG. 9 shows a first flow path plate 35*a* as an example of the plurality of flow path plates 35.

The first flow path plate 35*a* is disposed in the airflow path 33 by the first protrusion amount d1. The first flow path plate 35*a* is disposed at a position where a first protrusion part 36*a* is disposed in the first airflow path 33*a*. The first protrusion part 36*a* is an example of a protrusion part 36. The first protrusion part 36*a* is the part of the first flow path plate 35*a* disposed in the first airflow path 33*a* when the first flow path plate 35*a* is disposed at the position of the first protrusion amount d1. The first protrusion part 36*a* is a part corresponding to the X-Y cross section of the first flow path plate 35*a* that is located in the first airflow path 33*a*. The first flow path plate 35*a* corresponds to an example of a first partition plate. The first protrusion part 36*a* corresponds to an example of the first part. The first protrusion part 36*a* shown in FIG. 9 does not include the leg region that extends along the Z-axis, but may include the leg region.

Figure 10:
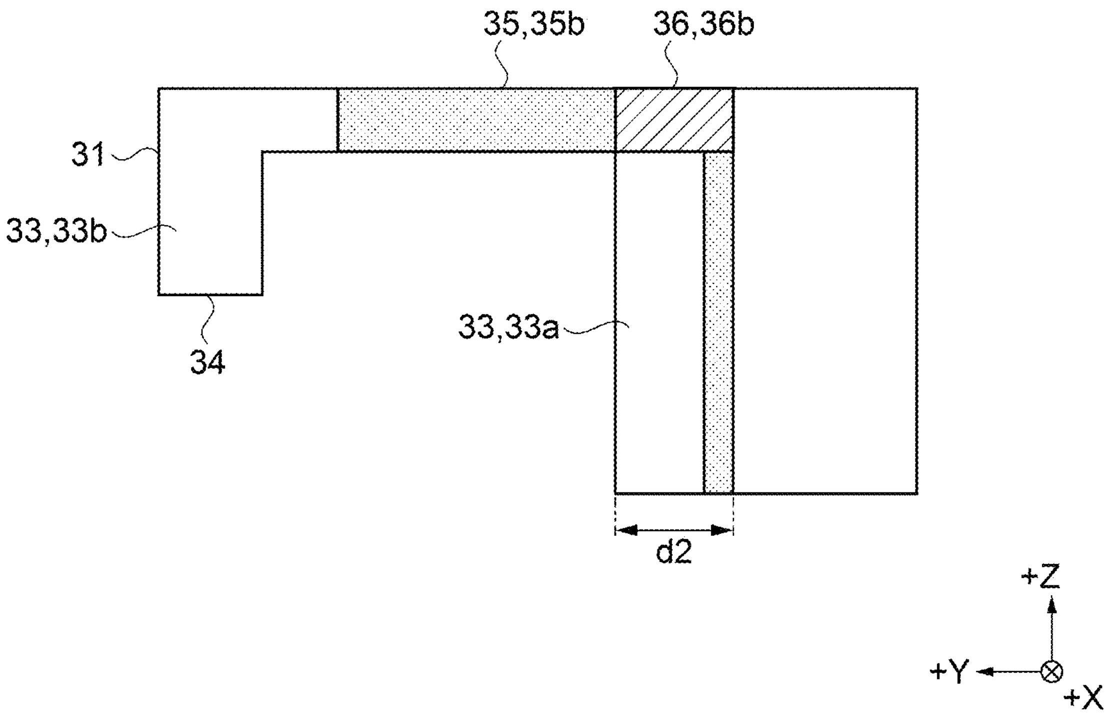
FIG. 10 is a view showing cross-sectional configuration of the air duct.

FIG. 10 shows cross-sectional configuration of the air duct 31. FIG. 10 shows a Y-Z cross section of the air duct 31. FIG. 10 shows a cross section taken along the line A-A shown in FIG. 6. In FIG. 10, the flow path plates 35 other than the second flow path plate 35*b* are omitted. The airflow path 33 is formed in the air duct 31. FIG. 10 shows the second flow path plate 35*b* as an example of the plurality of flow path plates 35.

The second flow path plate 35*b* is disposed in the airflow path 33 by the second protrusion amount d2. The second flow path plate 35*b* is disposed at a position where a second protrusion part 36*b* is disposed in the first airflow path 33*a*. The second protrusion part 36*b* is an example of the protrusion part 36. The second protrusion part 36*b* is the part of the second flow path plate 35*b* disposed in the first airflow path 33*a* while the second flow path plate 35*b* is disposed at the position of the second protrusion amount d2. The second protrusion part 36*b* is a part corresponding to the X-Y cross section of the second flow path plate 35*b* located in the first airflow path 33*a*. The second flow path plate 35*b* corresponds to an example of a second partition plate. The second protrusion part 36*b* corresponds to an example of a second part. The second protrusion part 36*b* shown in FIG. 10 does not include the leg region that extends along the Z-axis, but may include the leg region.

The first protrusion part 36*a* shown in FIG. 9 is configured to be narrower than the second protrusion part 36*b* shown in FIG. 10. The first flow path plate 35*a* is disposed at a position closer to the blower fan 41 than is the second flow path plate 35*b*. The first flow path plate 35*a* enables air in the first airflow path 33*a* to flow in the +X direction more than does the second flow path plate 35*b*. The difference between the flow rate of air guided to the feed port 34 by the first flow path plate 35*a* and the flow rate of air guided to the feed port 34 by the second flow path plate 35*b* is reduced.

It is desirable that the protrusion part 36 of an arbitrary flow path plate 35, among the plurality of flow path plates 35, be narrower than the protrusion part 36 of a flow path plate 35 disposed at a position that is farther from the blower fan 41 than is the arbitrary flow path plate 35, that is, at a position more distant from the blower fan 41 along the X-axis than is the arbitrary flow path plate 35. In other words, it is desirable that the length along the Y axis of the protrusion part 36 of the arbitrary flow path plate 35 be shorter than the length along the Y axis of the protrusion part 36 of a flow path plate 35 arranged at a position farther than the arbitrary flow path plate 35. The flow rate distribution of air fed from the feed port 34, which has an opening along the X-axis, is adjusted to a uniform or substantially uniform distribution by the plurality of flow path plates 35.

The printing device 11 includes the transport roller pair 26 for transporting a print medium M along the Y-axis, the printing unit 23 for ejecting ink onto the print medium M transported along the Y-axis, the outer housing 14 for housing the transport roller pair 26 and the printing unit 23, the blower fan 41 that is arranged at an end section of the outer housing 14 along the X-axis, which intersects with the Y-axis of the outer housing 14, and that blows air into the outer housing, the air duct 31 in which is formed the feed port 34 and the airflow path 33 for guiding air fed by the blower fan 41, the first flow path plate 35*a* that is arranged in the airflow path 33 and that guides air fed along the X-axis toward the feed port 34, and the second flow path plate 35*b* that is arranged in the airflow path 33 and that guides air sent along the X-axis toward the feed port 34.

Since the blower fan 41 is provided at an end section of the outer housing 14, the height of the housing upper surface 14C along the Z-axis can be reduced. At this time, since the first flow path plate 35*a* and the second flow path plate 35*b* are provided in the airflow path 33, the flow rate distribution of the air fed from the feed port 34 can be adjusted.

The airflow path 33 has the first airflow path 33*a* for guiding the air along the X-axis and the second airflow path 33*b* for guiding the air toward the feed port 34. The first flow path plate 35*a* is disposed at a position closer to the blower fan 41 than is the second flow path plate 35*b*. The first flow path plate 35*a* and the second flow path plate 35*b* are provided in the first airflow path 33*a* and in the second airflow path 33*b*. It is desirable that the first protrusion part 36*a* of the first flow path plate 35*a* disposed in the first airflow path 33*a* is narrower than the second protrusion part 36*b* of the second flow path plate 35*b* disposed in the first airflow path 33*a*. In other words, it is desirable that the length along the Y axis of the first protrusion part 36*a* of the first flow path plate 35*a* arranged in the first airflow path 33*a* is shorter than the length along the Y axis of the second protrusion part 36*b* of the second flow path plate 35*b* arranged in the first airflow path 33*a*.

It is possible to suppress a decrease in the flow rate of air fed to the feed port 34 at a position distant from the blower fan 41.

It is desirable that the first flow path plate 35*a* and the second flow path plate 35*b* have the same shape.

It is possible to construct the device with the same parts, and suppress an increase in manufacturing costs.

The printing device 11 is provided with the support member 15B for supporting the roll body RL around which the printing medium M is wound. It is desirable that the outer housing 14 has the housing upper surface 14C above the position where the printing medium M is transported and that the support member 15B supports the roll body RL at a position where at least a part of the roll body RL is disposed above the housing upper surface 14C.

The user can more easily access the roll body RL from the front of the printing device 11. For example, the user can mount the roll body RL into the feed unit 15 from the front of the printing device 11.

Second Embodiment

A second embodiment shows the printing device 11 including a first blower fan 42 and a second blower fan 43. The first blower fan 42 and the second blower fan 43 blow air into the printing device 11. The printing device 11 removes ink mist, dust, and the like that remains in the printing device 11 using the air fed in by the first blower fan 42 and the second blower fan 43. Alternatively, the printing device 11 cools the printing medium M, electric circuitry, and the like by the air fed in by the first blower fan 42 and the second blower fan 43.

Figure 11:
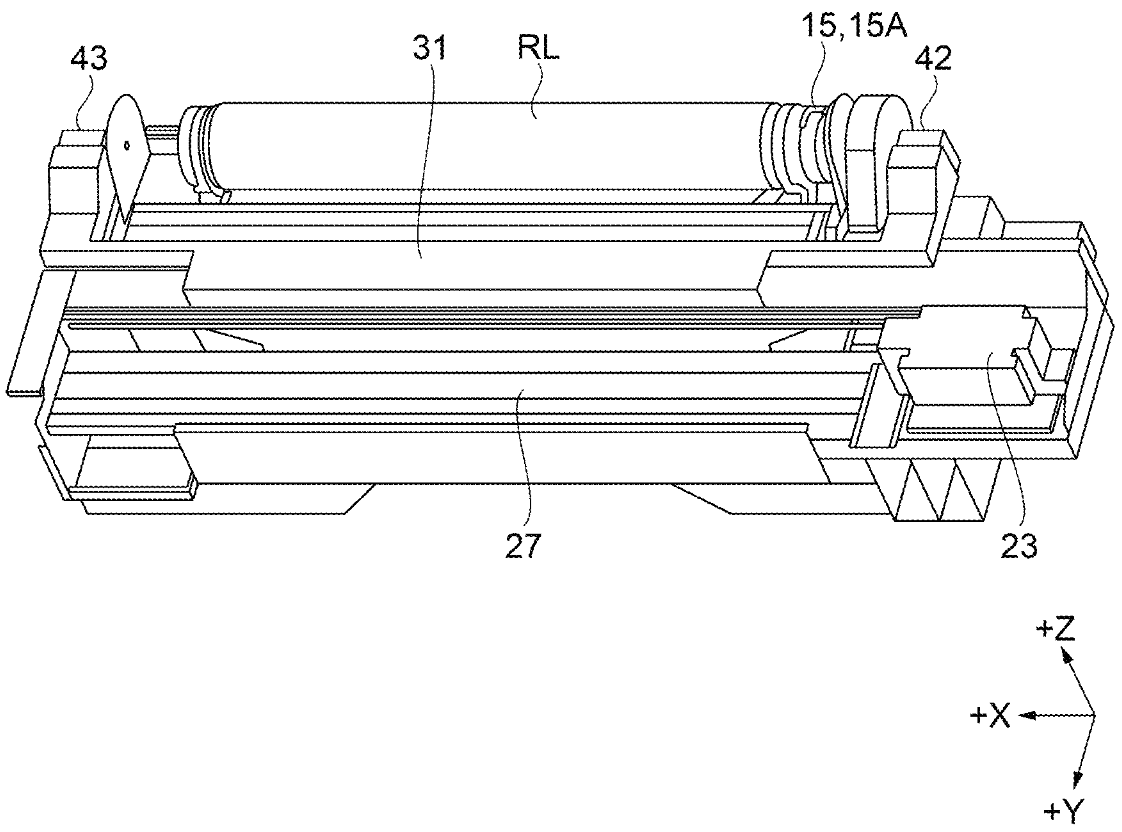
FIG. 11 is a diagram showing schematic configuration of the printing device.

FIG. 11 shows schematic configuration of the printing device 11. FIG. 11 is a perspective view of the printing device 11 in a state where the outer housing 14 and the roll cover 16 are removed. FIG. 11 shows the interior of the outer housing 14 and the interior of the feed unit 15. FIG. 11 shows a state in which the roll body RL is supported by the feed unit 15. FIG. 11 shows the drive mechanism 15A, the printing unit 23, the platen 27, the air duct 31, the first blower fan 42, and the second blower fan 43. The drive mechanism 15A, the printing unit 23, and the platen 27 shown in FIG. 11 have the same configurations as the drive mechanism 15A, the printing unit 23, and the platen 27 shown in FIG. 2.

The air duct 31 forms an airflow path 33 for guiding air to a feed port 34. The air duct 31 is disposed at a position in the +Z direction of the printing medium M that is transported inside of the outer housing 14. The air duct 31 circulates air along the X-axis. The air duct 31 is coupled to the first blower fan 42 and to the second blower fan 43. The air duct 31 corresponds to an example of a flow path member.

The first blower fan 42 feeds air into the air duct 31. The first blower fan 42 is disposed at a position further in the −X direction than is the transport path along which the printing medium M is transported. The first blower fan 42 is disposed in the first housing side section 14A, which is one end section of the outer housing 14 along the X-axis. The first blower fan 42 corresponds to an example of a fan.

The second blower fan 43 feeds air into the air duct 31. The second blower fan 43 is disposed at a position further in the +X direction than is the transport path along which the printing medium M is transported. The second blower fan 43 is disposed in the second housing side section 14B, which is the other end section in the direction opposite from the end section along the X axis of the outer housing 14. The second blower fan 43 corresponds to an example of a second fan.

It is desirable that the printing device 11 includes the first blower fan 42 and the second blower fan 43. In the printing device 11, the air flows in from both X-axial end sections, so that air is easily circulated in the range along the X-axis.

The first blower fan 42 and the second blower fan 43 may have different configurations or the same configuration. It is desirable that the first blower fan 42 and the second blower fan 43 have the same configuration. When the first blower fan 42 and the second blower fan 43 have the same configuration, it becomes more easy to make the flow rate of air in the printing device 11 at the −X direction end section of the air duct 31 equal to or substantially equal to the flow rate of air at the +X direction end section. The first blower fan 42 is disposed in the first housing side section 14A and the second blower fan 43 is disposed in the second housing side section 14B, but the present invention is not limited to this. The first blower fan 42 may be disposed in the second housing side section 14B and the second blower fan 43 may be disposed in the first housing side section 14A.

Figure 12:
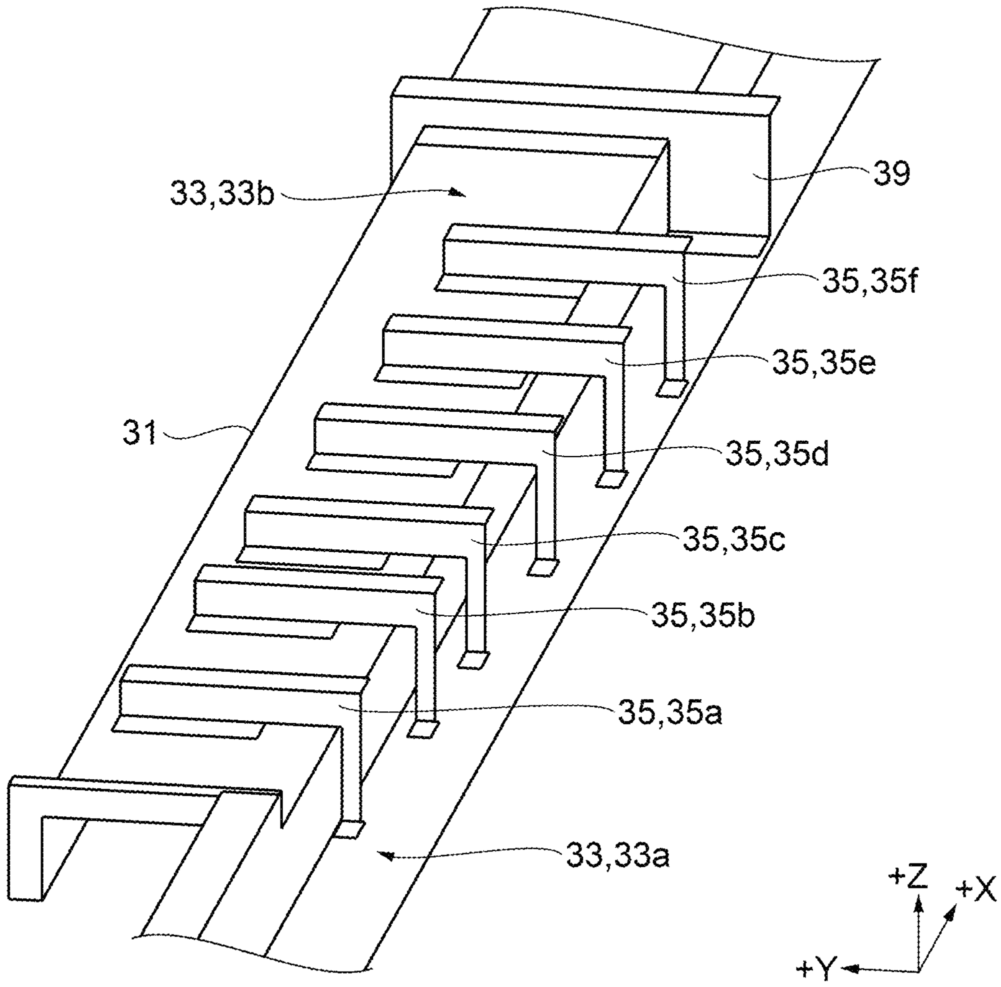
FIG. 12 is a view showing schematic configuration of the air duct.

FIG. 12 shows schematic structure of the air duct 31. FIG. 12 is a perspective view of the inside of the air duct 31. FIG. 12 shows schematic configuration of the airflow path 33 in the air duct 31. FIG. 12 shows schematic configuration of a section of the air duct 31 in the −X direction from the center along the X axis. The section of the air duct 31 in the +X direction from the center along the X axis has a symmetrical configuration of the section of the air duct 31 in the −X direction from the center along the X axis. The section of the air duct 31 in the +X direction from the center along the X axis is omitted. A plurality of flow path plates 35 and a dividing plate 39 are arranged in the airflow path 33.

The airflow path 33 constitutes a path that is wider than the medium width along the X-axis and air flows through it. The airflow path 33 is composed of a first airflow path 33*a* and a second airflow path 33*b* having different heights along the Z-axis.

The first airflow path 33*a* is a path through which air that was fed from the first blower fan 42 and the second blower fan 43 flows. The first airflow path 33*a* is coupled to the first blower fan 42 through the third airflow path 33*c*. The first airflow path 33*a* is coupled to the second blower fan 43 through a fourth airflow path 33*d*. The first airflow path 33*a* guides air along the X-axis. The X-axis corresponds to an example of a second axis. The first airflow path 33*a* corresponds to an example of a first flow path section.

The second airflow path 33*b* is a path through which flows air that has flowed through the first airflow path 33*a*. The second airflow path 33*b* guides the air toward the feed port 34. Air flows through the second airflow path 33*b* in the +Y direction along the Y axis. The second airflow path 33*b* corresponds to an example of a second flow path section.

The flow path plates 35 function as barriers for changing the direction in which air flows. The flow path plates 35 change the flow direction of the air flowing through the first airflow path 33*a* to the +Y direction. The flow path plates 35 guide air flowing through the first airflow path 33*a* to the second airflow path 33*b*. The flow path plates 35 are disposed in the first airflow path 33*a* and in the second airflow path 33*b*. The flow path plates 35 shown in FIG. 12 is formed in an L-shape, but are not limited to this. The configurations of the flow path plates 35 are not limited as long as they are configured to guide air flowing through the first airflow path 33*a* to the second airflow path 33*b*. The flow path plates 35 correspond to an example of a partition plate.

The plurality of flow path plates 35 are arranged in the airflow path 33. Six flow path plates 35 are arranged in the airflow path 33 shown in FIG. 12, that is, a first flow path plate 35*a*, a second flow path plate 35*b*, a third flow path plate 35*c*, a fourth flow path plate 35*d*, a fifth flow path plate 35*e*, and a sixth flow path plate 35*f*. The number of the flow path plates 35 is not limited to six. The number of the flow path plates 35 is appropriately set to two or more. By arranging the plurality of flow path plates 35, air can be fed to the printing medium M with a predetermined flow rate distribution with respect to the medium width. Any two of the first flow path plate 35*a*, the second flow path plate 35*b*, the third flow path plate 35*c*, the fourth flow path plate 35*d*, the fifth flow path plate 35*e*, and the sixth flow path plate 35*f* correspond to an example of a first partition plate and a second partition plate.

The configurations of the first flow path plate 35*a*, the second flow path plate 35*b*, the third flow path plate 35*c*, the fourth flow path plate 35*d*, the fifth flow path plate 35*e*, and the sixth flow path plate 35*f* shown in FIG. 12 are the same as the configurations of the first flow path plate 35*a*, the second flow path plate 35*b*, the third flow path plate 35*c*, the fourth flow path plate 35*d*, the fifth flow path plate 35*e*, and the sixth flow path plate 35*f* shown in FIG. 4. The arrangement intervals of the plurality of flow path plates 35 shown in FIG. 12 are shorter than the arrangement intervals of the plurality of flow path plates 35 shown in FIG. 4.

The dividing plate 39 divides the airflow path 33 into two sides, that is, a +X side and a −X side. The dividing plate 39 obstructs flow of air that is fed by the first blower fan 42 through the first airflow path 33*a* in the +X direction. The dividing plate 39 obstructs flow of air that is fed by the second blower fan 43 through the first airflow path 33*a* in the −X direction. The dividing plate 39 is disposed at a central section of the air duct 31 along the X axis. By installing the dividing plate 39, individual air flows are made to flow to the +X side and the −X side of the airflow path 33. The dividing plate 39 corresponds to an example of a cover member.

The dividing plate 39 may not be, but it is desirably, provided in the airflow path 33. By providing the dividing plate 39, it is possible to adjust the air flow on the +X side and the air flow on the −X side of the air duct 31 independently of each other. Interfering with the flow of air generated by the first blower fan 42 and the flow of air generated by the second blower fan 43 makes it possible to suppress variations in the flow rate of air fed from the feed port 34.

Figure 13:
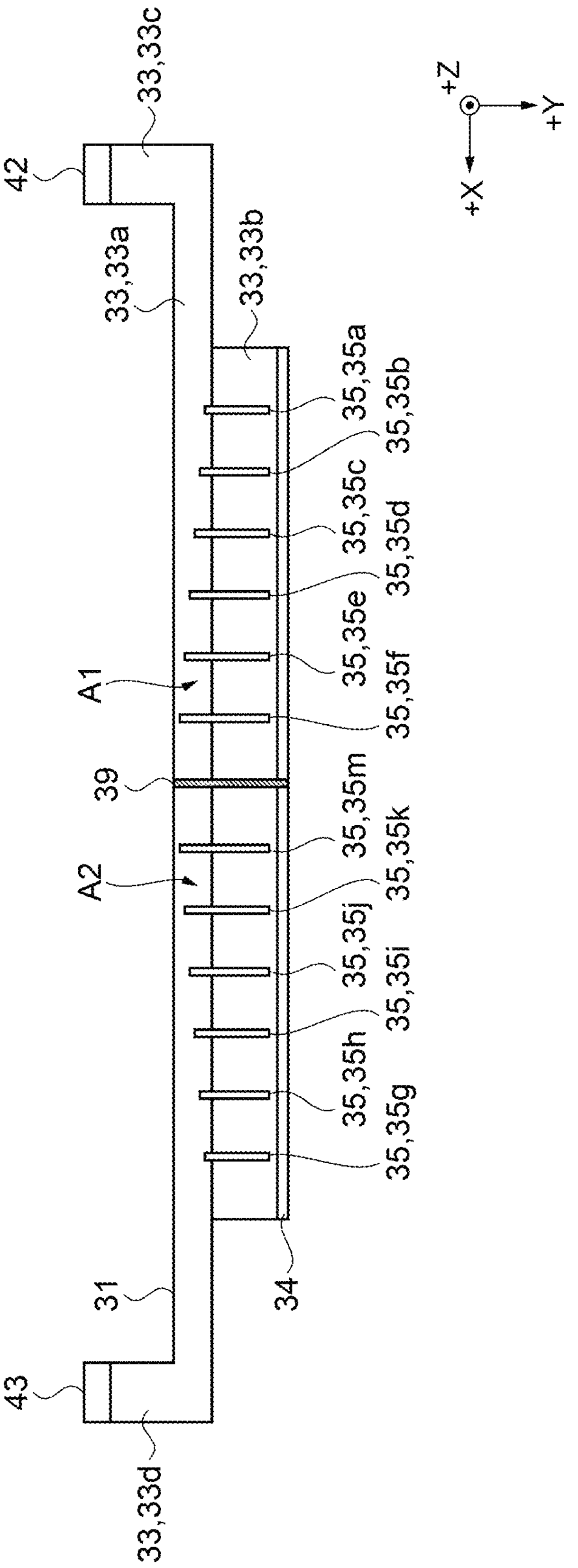
FIG. 13 is a diagram showing an example of schematic configuration of an airflow path.

FIG. 13 shows an example of schematic configuration of the airflow path 33. FIG. 13 shows an example arrangement and configuration of the plurality of flow path plates 35. FIG. 13 shows an X-Y cross section of the airflow path 33 as viewed from the +Z direction. The airflow path 33 is formed by the air duct 31, the plurality of flow path plates 35, and the dividing plate 39. The air duct 31 has the feed port 34 on its −Z direction surface. The air duct 31 is coupled to the first blower fan 42 and to the second blower fan 43.

The first blower fan 42 is disposed at an end section of the air duct 31 in the −X direction. The first blower fan 42 shown in FIG. 13 is arranged in the −Y direction. The first blower fan 42 circulates air in the +Y direction, and feeds air to the airflow path 33 in the air duct 31. The orientation of the first blower fan 42 is not limited to the configuration shown in FIG. 13. The first blower fan 42 may be arranged in the −X direction. The first blower fan 42 blows air into the first airflow path 33*a* in the air duct 31 and circulates the air in the +X direction.

The second blower fan 43 is disposed at the other end section of the air duct 31 on the side opposite to the −X direction end section. The second blower fan 43 shown in FIG. 13 is arranged in the −Y direction. The second blower fan 43 circulates the air in the +Y direction and feeds the air to the airflow path 33 in the air duct 31. The direction of the second blower fan 43 is not limited to the configuration shown in FIG. 13. The second blower fan 43 may be arranged in the +X direction. The second blower fan 43 feeds air into the first airflow path 33*a* in the air duct 31 and circulates air in the −X direction.

The airflow path 33 includes a first airflow path 33*a*, a second airflow path 33*b*, a third airflow path 33*c*, and a fourth airflow path 33*d*. The first airflow path 33*a* and the second airflow path 33*b* have the same configuration as the first airflow path 33*a* and the second airflow path 33*b* shown in the first embodiment. The first airflow path 33*a* and the second airflow path 33*b* are divided by the dividing plate 39 into a first region A1 on the −X side and a second region A2 on the +X side.

The third airflow path 33*c* is a path that connects the first airflow path 33*a* and the first blower fan 42. The third airflow path 33*c* is formed between the first airflow path 33*a* and the first blower fan 42. The third airflow path 33*c* causes the air fed into the air duct 31 by the first blower fan 42 to flow into the first airflow path 33*a*. The third airflow path 33*c* guides the air flowing through the first region A1. The first airflow path 33*a* circulates air fed from the first blower fan 42 through the third airflow path 33*c* in the +X direction along the X axis.

The fourth airflow path 33*d* is a path that connects the first airflow path 33*a* and the second blower fan 43. The fourth airflow path 33*d* is configured between the first airflow path 33*a* and the second blower fan 43. The fourth airflow path 33*d* causes air fed into the air duct 31 by the second blower fan 43 to flow through the first airflow path 33*a*. The fourth airflow path 33*d* guides air flowing through the second region A2. The first airflow path 33*a* circulates air fed from the second blower fan 43 via the fourth airflow path 33*d* in the −X direction along the X axis.

The plurality of flow path plates 35 are arranged in the airflow path 33. The first flow path plate 35*a*, the second flow path plate 35*b*, the third flow path plate 35*c*, the fourth flow path plate 35*d*, the fifth flow path plate 35*e*, and the sixth flow path plate 35*f* are disposed in the first region A1. A seventh flow path plate 35*g*, an eighth flow path plate 35*h*, a ninth flow path plate 35*i*, a tenth flow path plate 35*j*, an eleventh flow path plate 35*k*, and a twelfth flow path plate 35*m* are arranged in the second region A2.

The first flow path plate 35*a*, the second flow path plate 35*b*, the third flow path plate 35*c*, the fourth flow path plate 35*d*, the fifth flow path plate 35*e*, and the sixth flow path plate 35*f* shown in FIG. 13 have different shapes from each other. The first flow path plate 35*a*, the second flow path plate 35*b*, the third flow path plate 35*c*, the fourth flow path plate 35*d*, the fifth flow path plate 35*e*, and the sixth flow path plate 35*f* have different lengths from each other along the Y axis.

Among the plurality of flow path plates 35, the first flow path plate 35*a* is disposed at a position that is closest to the first blower fan 42. Among the plurality of flow path plates 35, the first flow path plate 35*a* is configured to have the shortest length along the Y axis. The first protrusion amount d1 of the first flow path plate 35*a* into the first airflow path 33*a* is smaller than the protrusion amounts of the other flow path plates 35 into the first airflow path 33*a*. The first protrusion amount d1 and the like will be described later.

The second flow path plate 35*b* is disposed at a position further in the +X direction than is the first flow path plate 35*a*. The first flow path plate 35*a* is disposed at a position closer to the first blower fan 42 than is the second flow path plate 35*b*. The second flow path plate 35*b* has shape with a length that is longer along the Y axis than the first flow path plate 35*a*. The second protrusion amount d2 of the second flow path plate 35*b* into the first airflow path 33*a* is larger than the first protrusion amount d1 of the first flow path plate 35*a* into the first airflow path 33*a*.

The third flow path plate 35*c* is disposed at a position further in the +X direction than are the first flow path plate 35*a* and the second flow path plate 35*b*. The first flow path plate 35*a* and the second flow path plate 35*b* are disposed at positions closer to the first blower fan 42 than is the third flow path plate 35*c*. The third flow path plate 35*c* has a shape with a length that is longer along the Y-axis than the first flow path plate 35*a* and the second flow path plate 35*b*. The third protrusion amount d3 of the third flow path plate 35*c* into the first airflow path 33*a* is larger than the first protrusion amount d1 and the second protrusion amount d2.

The fourth flow path plate 35*d* is disposed at a position further in the +X direction than the first flow path plate 35*a*, the second flow path plate 35*b*, and the third flow path plate 35*c*. The first flow path plate 35*a*, the second flow path plate 35*b*, and the third flow path plate 35*c* are disposed at positions closer to the first blower fan 42 than is the fourth flow path plate 35*d*. The fourth flow path plate 35*d* has a shape with a length that is longer along the Y-axis than the first flow path plate 35*a*, the second flow path plate 35*b*, and the third flow path plate 35*c*. The fourth protrusion amount d4 of the fourth flow path plate 35*d* into the first airflow path 33*a* is larger than the first protrusion amount d1, the second protrusion amount d2, and the third protrusion amount d3.

The fifth flow path plate 35*e* is disposed at a position further in the +X direction than are the first flow path plate 35*a*, the second flow path plate 35*b*, the third flow path plate 35*c*, and the fourth flow path plate 35*d*. The first flow path plate 35*a*, the second flow path plate 35*b*, the third flow path plate 35*c*, and the fourth flow path plate 35*d* are disposed at positions closer to the first blower fan 42 than is the fifth flow path plate 35*e*. The fifth flow path plate 35*e* has a shape with a length that is longer along the Y axis than the first flow path plate 35*a*, the second flow path plate 35*b*, the third flow path plate 35*c*, and the fourth flow path plate 35*d*. The fifth protrusion amount d5 of the fifth flow path plate 35*e* into the first airflow path 33*a* is larger than the first protrusion amount d1, the second protrusion amount d2, the third protrusion amount d3, and the fourth protrusion amount d4.

The sixth flow path plate 35*f* is disposed at a position further in the +X direction than are the first flow path plate 35*a*, the second flow path plate 35*b*, the third flow path plate 35*c*, the fourth flow path plate 35*d*, and the fifth flow path plate 35*e*. The first flow path plate 35*a*, the second flow path plate 35*b*, the third flow path plate 35*c*, the fourth flow path plate 35*d*, and the fifth flow path plate 35*e* are disposed at positions closer to the first blower fan 42 than is the sixth flow path plate 35*f*. The sixth flow path plate 35*f* has a shape with a length that is longer along the Y-axis than the first flow path plate 35*a*, the second flow path plate 35*b*, the third flow path plate 35*c*, the fourth flow path plate 35*d*, and the fifth flow path plate 35*e*. The sixth protrusion amount d6 of the sixth flow path plate 35*f* into the first airflow path 33*a* is larger than the first protrusion amount d1, the second protrusion amount d2, the third protrusion amount d3, the fourth protrusion amount d4, and the fifth protrusion amount d5.

The seventh flow path plate 35*g*, the eighth flow path plate 35*h*, the ninth flow path plate 35*i*, the tenth flow path plate 35*j*, the eleventh flow path plate 35*k*, and the twelfth flow path plate 35*m* shown in FIG. 13 have different shapes from each other. The seventh flow path plate 35*g*, the eighth flow path plate 35*h*, the ninth flow path plate 35*i*, the tenth flow path plate 35*j*, the eleventh flow path plate 35*k*, and the twelfth flow path plate 35*m* have different lengths from each other along the Y axis.

Among the plurality of flow path plates 35, the seventh flow path plate 35*g* is disposed at the position closest to the second blower fan 43. Among the plurality of flow path plates 35, the seventh flow path plate 35*g* is configured to have the shortest length along the Y axis. The seventh protrusion amount d7 of the seventh flow path plate 35*g* into the first airflow path 33*a* is smaller than the protrusion amounts of the other flow path plates 35 into the first airflow path 33*a*.

The eighth flow path plate 35*h* is arranged at a position further in the −X direction than is the seventh flow path plate 35*g*. The seventh flow path plate 35*g* is disposed at a position closer to the second blower fan 43 than is the eighth flow path plate 35*h*. The eighth flow path plate 35*h* is configured in a shape having a length that is longer along the Y-axis than is the seventh flow path plate 35*g*. The second protrusion amount d8 of the eighth flow path plate 35*h* into the first airflow path 33*a* is larger than the seventh protrusion amount d7 of the seventh flow path plate 35*g* into the first airflow path 33*a*.

The ninth flow path plate 35*i* is disposed at a position further in the −X direction than are the seventh flow path plate 35*g* and the eighth flow path plate 35*h*. The seventh flow path plate 35*g* and the eighth flow path plate 35*h* are disposed at positions closer to the second blower fan 43 than is the ninth flow path plate 35*i*. The ninth flow path plate 35*i* is configured in a shape having a length along the Y-axis that is longer than that of the seventh flow path plate 35*g* and of the eighth flow path plate 35*h*. The ninth protrusion amount d9 of the ninth flow path plate 35*i* into the first airflow path 33*a* is larger than the seventh protrusion amount d7 and the eighth protrusion amount d8.

The tenth flow path plate 35*j* is disposed at a position further in the −X direction than are the seventh flow path plate 35*g*, the eighth flow path plate 35*h*, and the ninth flow path plate 35*i*. The seventh flow path plate 35*g*, the eighth flow path plate 35*h*, and the ninth flow path plate 35*i* are disposed at positions closer to the second blower fan 43 than is the tenth flow path plate 35*j*. The tenth flow path plate 35*j* is configured in a shape having a length along the Y axis longer than lengths of the seventh flow path plate 35*g*, the eighth flow path plate 35*h*, and the ninth flow path plate 35*i*. The tenth protrusion amount d10 of the tenth flow path plate 35*j* into the first airflow path 33*a* is larger than the seventh protrusion amount d7, the eighth protrusion amount d8, and the ninth protrusion amount d9.

The eleventh flow path plate 35*k* is disposed at a position further in the −X direction than are the seventh flow path plate 35*g*, the eighth flow path plate 35*h*, the ninth flow path plate 35*i*, and the tenth flow path plate 35*j*. The seventh flow path plate 35*g*, the eighth flow path plate 35*h*, the ninth flow path plate 35*i*, and the tenth flow path plate 35*j* are disposed closer to the second blower fan 43 than is the eleventh flow path plate 35*k*. The eleventh flow path plate 35*k* is configured to have a shape with a length longer along the Y-axis than the seventh flow path plate 35*g*, the eighth flow path plate 35*h*, the ninth flow path plate 35*i*, and the tenth flow path plate 35*j*. The eleventh protrusion amount d11 of the eleventh flow path plate 35*k* into the first airflow path 33*a* is larger than the seventh protrusion amount d7, the eighth protrusion amount d8, the ninth protrusion amount d9, and the tenth protrusion amount d10.

The twelfth flow path plate 35*m* is disposed at a position further in the −X direction than are the seventh flow path plate 35*g*, the eighth flow path plate 35*h*, the ninth flow path plate 35*i*, the tenth flow path plate 35*j*, and the eleventh flow path plate 35*k*. The seventh flow path plate 35*g*, the eighth flow path plate 35*h*, the ninth flow path plate 35*i*, the tenth flow path plate 35*j*, and the eleventh flow path plate 35*k* are disposed at positions closer to the second blower fan 43 than is the twelfth flow path plate 35*m*. The twelfth flow path plate 35*m* is formed in a shape having a length along the Y axis longer than those of the seventh flow path plate 35*g*, the eighth flow path plate 35*h*, the ninth flow path plate 35*i*, the tenth flow path plate 35*j*, and the eleventh flow path plate 35*k*. The twelfth protrusion amount d12 of the twelfth flow path plate 35*m* into the first airflow path 33*a* is larger than the seventh protrusion amount d7, the eighth protrusion amount d8, the ninth protrusion amount d9, the tenth protrusion amount d10, and the eleventh protrusion amount d11.

By arranging the plurality of flow path plates 35 in the airflow path 33 at predetermined intervals along the X-axis, the flow rate distribution of the air fed from the feed port 34 along the X-axis can be adjusted to a predetermined distribution. By arranging the plurality of flow path plates 35 shown in FIG. 13, the difference between the flow rate of the air fed from the −X direction end section of the feed port 34 and the flow rate of the air fed from the central section along the X axis of the feed port 34 is reduced. The difference between the flow rate of the air fed from the +X direction end section of the feed port 34 and the flow rate of the air fed from the central section of the feed port 34 along the X axis is reduced.

Figure 14:
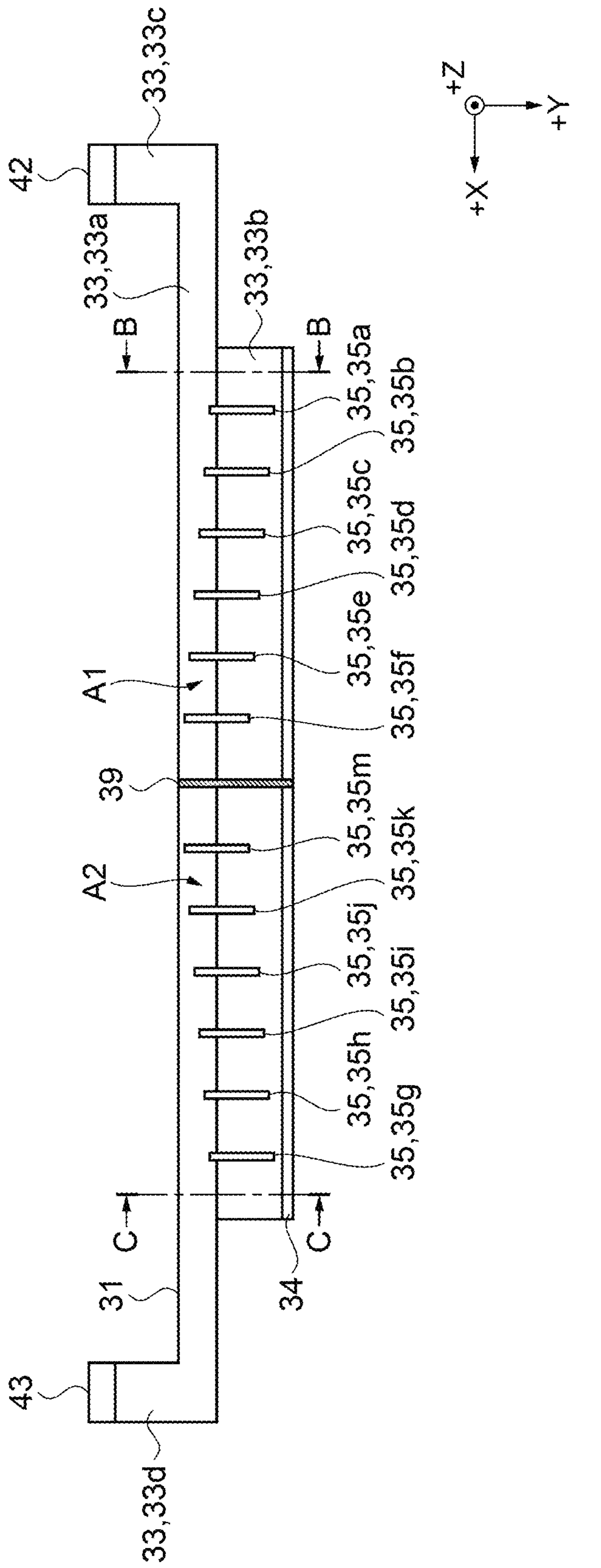
FIG. 14 is a diagram showing an example of schematic configuration of the airflow path.

FIG. 14 shows an example of schematic configuration of the airflow path 33. FIG. 14 shows an example of the arrangement and configuration of the plurality of flow path plates 35. FIG. 14 shows an X-Y cross section of the airflow path 33 as viewed from the +Z direction. FIG. 14 shows schematic configuration of an airflow path 33 different from the airflow path 33 shown in FIG. 13. The airflow path 33 is formed by the air duct 31, the plurality of flow path plates 35, and the dividing plate 39. The air duct 31 is coupled to the first blower fan 42 and to the second blower fan 43. The air duct 31 has the feed port 34 on its −Z direction surface. The first blower fan 42 and the second blower fan 43 shown in FIG. 14 have the same configuration as the first blower fan 42 and the second blower fan 43 shown in FIG. 13.

The airflow path 33 includes a first airflow path 33*a*, a second airflow path 33*b*, a third airflow path 33*c*, and a fourth airflow path 33*d*. The first airflow path 33*a*, the second airflow path 33*b*, the third airflow path 33*c*, and the fourth airflow path 33*d* shown in FIG. 14 have the same configuration as the first airflow path 33*a*, the second airflow path 33*b*, the third airflow path 33*c*, and the fourth airflow path 33*d* shown in FIG. 13.

The plurality of flow path plates 35 shown in FIG. 14 have the same shape. The plurality of flow path plates 35 are arranged at different positions along the Y axis. Since the positions along the Y axis are different from each other, the protrusion amounts of the plurality of flow path plates 35 in the first airflow path 33*a* are different from each other.

Among the plurality of flow path plates 35, the first flow path plate 35*a* is disposed at a position that is closest to the first blower fan 42. Among the plurality of flow path plates 35, the first flow path plate 35*a* is disposed at a position that is furthest in the +Y direction and that is closest to the feed port 34. The first protrusion amount d1 of the first flow path plate 35*a* into the first airflow path 33*a* is smaller than the protrusion amounts of the other flow path plates 35 into the first airflow path 33*a*.

The second flow path plate 35*b* is disposed at a position further in the +X direction than is the first flow path plate 35*a*. The first flow path plate 35*a* is disposed at a position closer to the first blower fan 42 than is the second flow path plate 35*b*. The second flow path plate 35*b* is located at a position that is further in the −Y direction than, and that is farther from the feed port 34 than, the first flow path plate 35*a*. The second protrusion amount d2 of the second flow path plate 35*b* into the first airflow path 33*a* is larger than the first protrusion amount d1 of the first flow path plate 35*a* into the first airflow path 33*a*.

The third flow path plate 35*c* is disposed at a position further in the +X direction than are the first flow path plate 35*a* and the second flow path plate 35*b*. The first flow path plate 35*a* and the second flow path plate 35*b* are disposed at positions closer to the first blower fan 42 than is the third flow path plate 35*c*. The third flow path plate 35*c* is located at a position that is further in the −Y direction than, and that is farther from the feed port 34 than, are the first flow path plate 35*a* and the second flow path plate 35*b*. The third protrusion amount d3 of the third flow path plate 35*c* into the first airflow path 33*a* is larger than the first protrusion amount d1 and the second protrusion amount d2.

The fourth flow path plate 35*d* is disposed at a position further in the +X direction than the first flow path plate 35*a*, the second flow path plate 35*b*, and the third flow path plate 35*c*. The first flow path plate 35*a*, the second flow path plate 35*b*, and the third flow path plate 35*c* are disposed at positions closer to the first blower fan 42 than is the fourth flow path plate 35*d*. The fourth flow path plate 35*d* is located at a position that is further in the −Y direction than, and that is farther from the feed port 34 than, are the first flow path plate 35*a*, the second flow path plate 35*b*, and the third flow path plate 35*c*. The fourth protrusion amount d4 of the fourth flow path plate 35*d* into the first airflow path 33*a* is larger than the first protrusion amount d1, the second protrusion amount d2, and the third protrusion amount d3.

The fifth flow path plate 35*e* is disposed at a position further in the +X direction than are the first flow path plate 35*a*, the second flow path plate 35*b*, the third flow path plate 35*c*, and the fourth flow path plate 35*d*. The first flow path plate 35*a*, the second flow path plate 35*b*, the third flow path plate 35*c*, and the fourth flow path plate 35*d* are disposed at positions closer to the first blower fan 42 than is the fifth flow path plate 35*e*. The fifth flow path plate 35*e* is located at a position that is further in the −Y direction than, and that is farther from the feed port 34 than, are the first flow path plate 35*a*, the second flow path plate 35*b*, the third flow path plate 35*c*, and the fourth flow path plate 35*d*. The fifth protrusion amount d5 of the fifth flow path plate 35*e* into the first airflow path 33*a* is larger than the first protrusion amount d1, the second protrusion amount d2, the third protrusion amount d3, and the fourth protrusion amount d4.

The sixth flow path plate 35*f* is disposed at a position further in the +X direction than are the first flow path plate 35*a*, the second flow path plate 35*b*, the third flow path plate 35*c*, the fourth flow path plate 35*d*, and the fifth flow path plate 35*e*. The first flow path plate 35*a*, the second flow path plate 35*b*, the third flow path plate 35*c*, the fourth flow path plate 35*d*, and the fifth flow path plate 35*e* are disposed at positions closer to the first blower fan 42 than is the sixth flow path plate 35*f*. The sixth flow path plate 35*f* is located at a position that is further in the −Y direction than, and that is farther from the feed port 34 than, are the first flow path plate 35*a*, the second flow path plate 35*b*, the third flow path plate 35*c*, the fourth flow path plate 35*d*, and the fifth flow path plate 35*e*. The sixth protrusion amount d6 of the sixth flow path plate 35*f* into the first airflow path 33*a* is larger than the first protrusion amount d1, the second protrusion amount d2, the third protrusion amount d3, the fourth protrusion amount d4, and the fifth protrusion amount d5.

Among the plurality of flow path plates 35, the seventh flow path plate 35*g* is disposed at the position closest to the second blower fan 43. The seventh flow path plate 35*g* is disposed at a position closest to the feed port 34 in the +Y direction among the plurality of flow path plates 35. The seventh protrusion amount d7 of the seventh flow path plate 35*g* into the first airflow path 33*a* is smaller than the protrusion amounts of the other flow path plates 35 into the first airflow path 33*a*.

The eighth flow path plate 35*h* is arranged at a position further in the −X direction than is the seventh flow path plate 35*g*. The seventh flow path plate 35*g* is disposed at a position closer to the second blower fan 43 than is the eighth flow path plate 35*h*. The eighth flow path plate 35*h* is located at a position that is further in the −Y direction than, and that is farther from the feed port 34 than, the seventh flow path plate 35*g*. The eighth protrusion amount d8 of the eighth flow path plate 35*h* into the first airflow path 33*a* is larger than the seventh protrusion amount d7 of the seventh flow path plate 35*g* into the first airflow path 33*a*.

The ninth flow path plate 35*i* is disposed at a position further in the −X direction than are the seventh flow path plate 35*g* and the eighth flow path plate 35*h*. The seventh flow path plate 35*g* and the eighth flow path plate 35*h* are disposed at positions closer to the second blower fan 43 than is the ninth flow path plate 35*i*. The ninth flow path plate 35*i* is located at a position that is further in the −Y direction than, and that is farther from the feed port 34 than, are the seventh flow path plate 35*g* and the eighth flow path plate 35*h*. The ninth protrusion amount d9 of the ninth flow path plate 35*i* into the first airflow path 33*a* is larger than the seventh protrusion amount d7 and the eighth protrusion amount d8.

The tenth flow path plate 35*j* is disposed at a position further in the −X direction than are the seventh flow path plate 35*g*, the eighth flow path plate 35*h*, and the ninth flow path plate 35*i*. The seventh flow path plate 35*g*, the eighth flow path plate 35*h*, and the ninth flow path plate 35*i* are disposed at positions closer to the second blower fan 43 than is the tenth flow path plate 35*j*. The tenth flow path plate 35*j* is located at a position that is further in the −Y direction than, and that is farther from the feed port 34 than, are the seventh flow path plate 35*g*, the eighth flow path plate 35*h*, and the ninth flow path plate 35*i*. The tenth protrusion amount d10 of the tenth flow path plate 35*j* into the first airflow path 33*a* is larger than the seventh protrusion amount d7, the eighth protrusion amount d8, and the ninth protrusion amount d9.

The eleventh flow path plate 35*k* is disposed at a position further in the −X direction than are the seventh flow path plate 35*g*, the eighth flow path plate 35*h*, the ninth flow path plate 35*i*, and the tenth flow path plate 35*j*. The seventh flow path plate 35*g*, the eighth flow path plate 35*h*, the ninth flow path plate 35*i*, and the tenth flow path plate 35*j* are disposed closer to the second blower fan 43 than is the eleventh flow path plate 35*k*. The eleventh flow path plate 35*k* is located at a position that is further in the −Y direction than, and that is farther from the feed port 34 than, are the seventh flow path plate 35*g*, the eighth flow path plate 35*h*, the ninth flow path plate 35*i*, and the tenth flow path plate 35*j*. The eleventh protrusion amount d11 of the eleventh flow path plate 35*k* into the first airflow path 33*a* is larger than the seventh protrusion amount d7, the eighth protrusion amount d8, the ninth protrusion amount d9, and the tenth protrusion amount d10.

The twelfth flow path plate 35*m* is disposed at a position further in the −X direction than are the seventh flow path plate 35*g*, the eighth flow path plate 35*h*, the ninth flow path plate 35*i*, the tenth flow path plate 35*j*, and the eleventh flow path plate 35*k*. The seventh flow path plate 35*g*, the eighth flow path plate 35*h*, the ninth flow path plate 35*i*, the tenth flow path plate 35*j*, and the eleventh flow path plate 35*k* are disposed at positions closer to the second blower fan 43 than is the twelfth flow path plate 35*m*. The twelfth flow path plate 35*m* is located at a position that is further in the −Y direction than, and that is farther from the feed port 34 than, are the seventh flow path plate 35*g*, the eighth flow path plate 35*h*, the ninth flow path plate 35*i*, the tenth flow path plate 35*j*, and the eleventh flow path plate 35*k*. The twelfth protrusion amount d12 of the twelfth flow path plate 35*m* into the first airflow path 33*a* is larger than the seventh protrusion amount d7, the eighth protrusion amount d8, the ninth protrusion amount d9, the tenth protrusion amount d10, and the eleventh protrusion amount d11.

Figure 15:
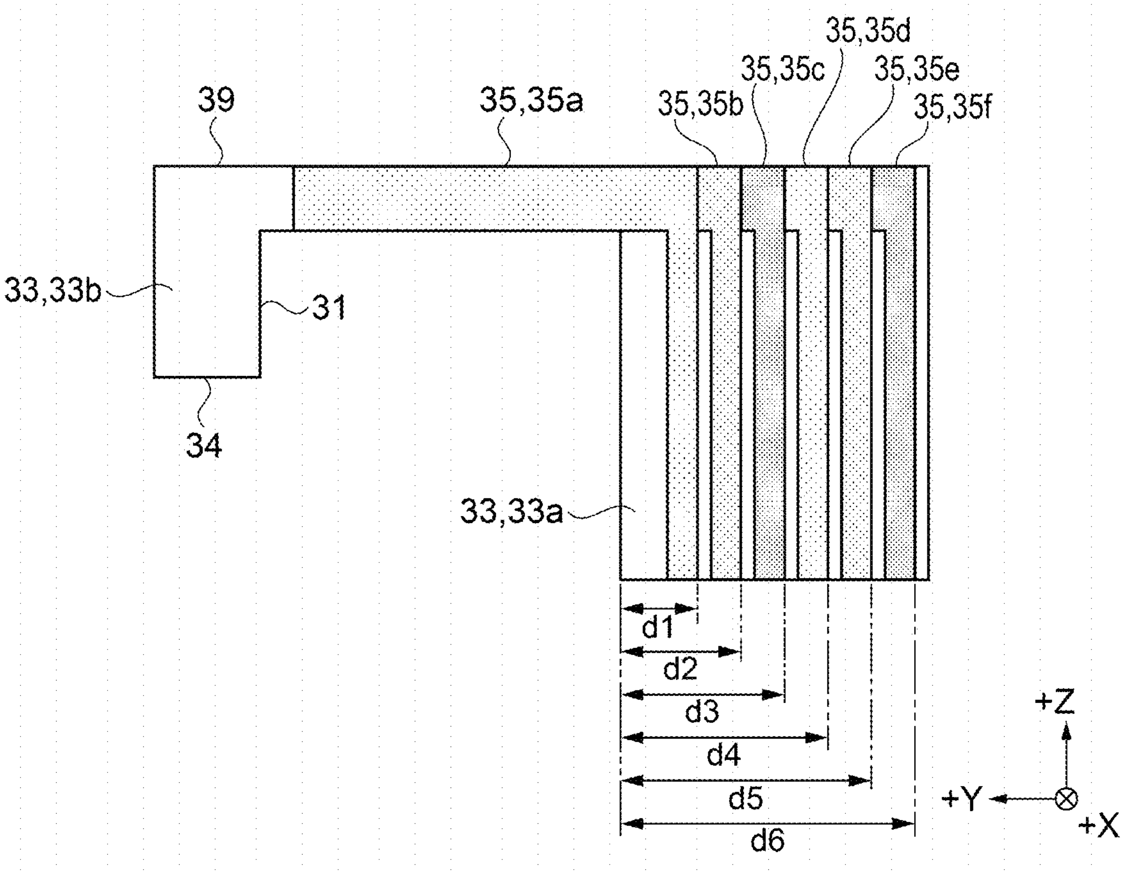
FIG. 15 is a view showing cross-sectional configuration of the air duct.

FIG. 15 shows cross-sectional configuration of the air duct 31. FIG. 15 shows a Y-Z cross section of the air duct 31. FIG. 15 shows a cross section taken along the line B-B shown in FIG. 14. FIG. 15 shows the plurality of flow path plates 35. The dividing plate 39 is arranged at a position in the +X direction from the plurality of flow path plates 35. FIG. 15 shows the first region A1 of the airflow path 33. FIG. 15 shows a first protrusion amount d1, a second protrusion amount d2, a third protrusion amount d3, a fourth protrusion amount d4, a fifth protrusion amount d5, and a sixth protrusion amount d6.

The protrusion amount indicates an amount by which a flow path plate 35 is inserted into the first airflow path 33*a*. The plurality of flow path plates 35 shown in FIG. 15 have the same shape. The protrusion amount corresponds to the position where the flow path plate 35 is installed. When the installation position of a flow path plate 35 is moved to a position in the −Y direction, the protrusion amount increases. When the protrusion amount increases, the X-Y cross sectional area of the flow path plates 35 located in the first airflow path 33*a* increases. When the X-Y cross sectional area of a flow path plate 35 located in the first airflow path 33*a* increases, the flow rate of air flowing in the +X direction decreases and the flow rate of air flowing in the +Y direction increases. The flow rate of air guided toward the feed port 34 increases.

It is desirable that the first protrusion amount d1, the second protrusion amount d2, the third protrusion amount d3, the fourth protrusion amount d4, the fifth protrusion amount d5, and the sixth protrusion amount d6 are arranged in a relationship represented by the following equation (2).

$$d1 \leq d2 \leq d3 \leq d4 \leq d5 \leq d6 \quad (2)$$

By arranging the plurality of flow path plates 35 in the arrangement having the relationship shown in equation (2), the flow rate of air at the feed port 34, which is formed by the opening along the X axis, becomes uniform or substantially uniform along the X axis.

Figure 16:
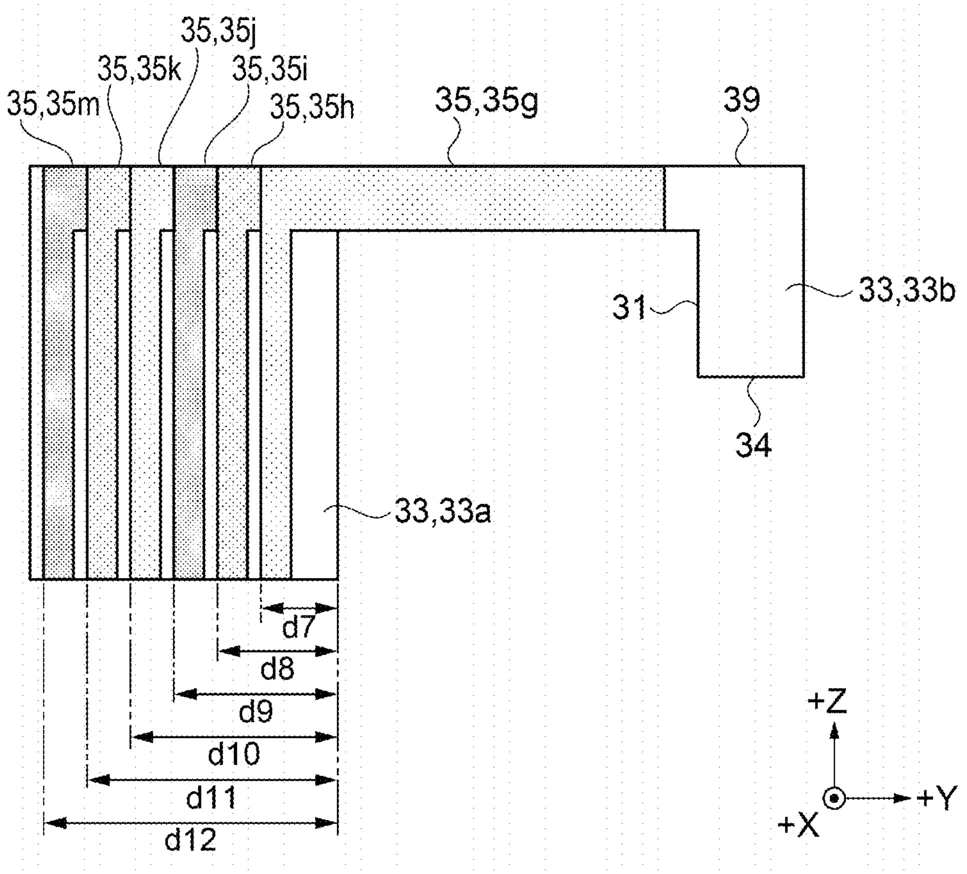
FIG. 16 is diagram showing cross-sectional configuration of the air duct.

FIG. 16 shows cross-sectional configuration of the air duct 31. FIG. 16 shows a Y-Z cross section of the air duct 31. FIG. 16 shows a cross section taken along the line C-C shown in FIG. 14. FIG. 16 shows a plurality of flow path plates 35. The dividing plate 39 is arranged at a position in the −X direction from the plurality of flow path plates 35. FIG. 16 shows the second region A2 of the airflow path 33. FIG. 16 shows a seventh protrusion amount d7, an eighth protrusion amount d8, a ninth protrusion amount d9, a tenth protrusion amount d10, an eleventh protrusion amount d11, and a twelfth protrusion amount d12.

The plurality of flow path plates 35 shown in FIG. 16 have the same shape. The protrusion amount corresponds to the position where the flow path plate 35 is installed. When the installation position of a flow path plate 35 is moved to a position in the −Y direction, the protrusion amount increases. When the protrusion amount increases, the X-Y cross sectional area of the flow path plates 35 located in the first airflow path 33*a* increases. When the X-Y cross sectional area of the flow path plate 35 that is located in the first airflow path 33*a* increases, the flow rate of air flowing in the −X direction decreases and the flow rate of air flowing in the +Y direction increases. The flow rate of air guided toward the feed port 34 increases.

It is desirable that the seventh protrusion amount d7, the eighth protrusion amount d8, the ninth protrusion amount d9, the tenth protrusion amount d10, the eleventh protrusion amount d11, and the twelfth protrusion amount d12 are arranged in a relationship represented by the following equation (3).

$$d7 \leq d8 \leq d9 \leq d10 \leq d11 \leq d12 \quad (3)$$

By arranging the plurality of flow path plates 35 in the arrangement having the relationship shown in equation (3), the flow rate of air at the feed port 34, which is formed by an opening along the X axis, becomes uniform or substantially uniform along the X axis.

The printing device 11 is provided with a second blower fan 43 that is arranged at the other end section of the outer housing 14 along the X-axis and that blows air into the outer housing 14.

By providing the first blower fan 42 and the second blower fan 43, it becomes easier to feed the air to the entire medium width along the X axis of the outer housing 14.

The printing device 11 is desirably provided with a dividing plate 39 that is disposed in the airflow path 33 and that obstructs air from being blown along the X-axis.

By providing the dividing plate 39, the air that flows in the first region A1 and in the second region A2 of the airflow path 33 can be individually adjusted. The flow rate distribution of the air fed from the feed port 34 provided along the X-axis is easily adjusted.

Figure 17:
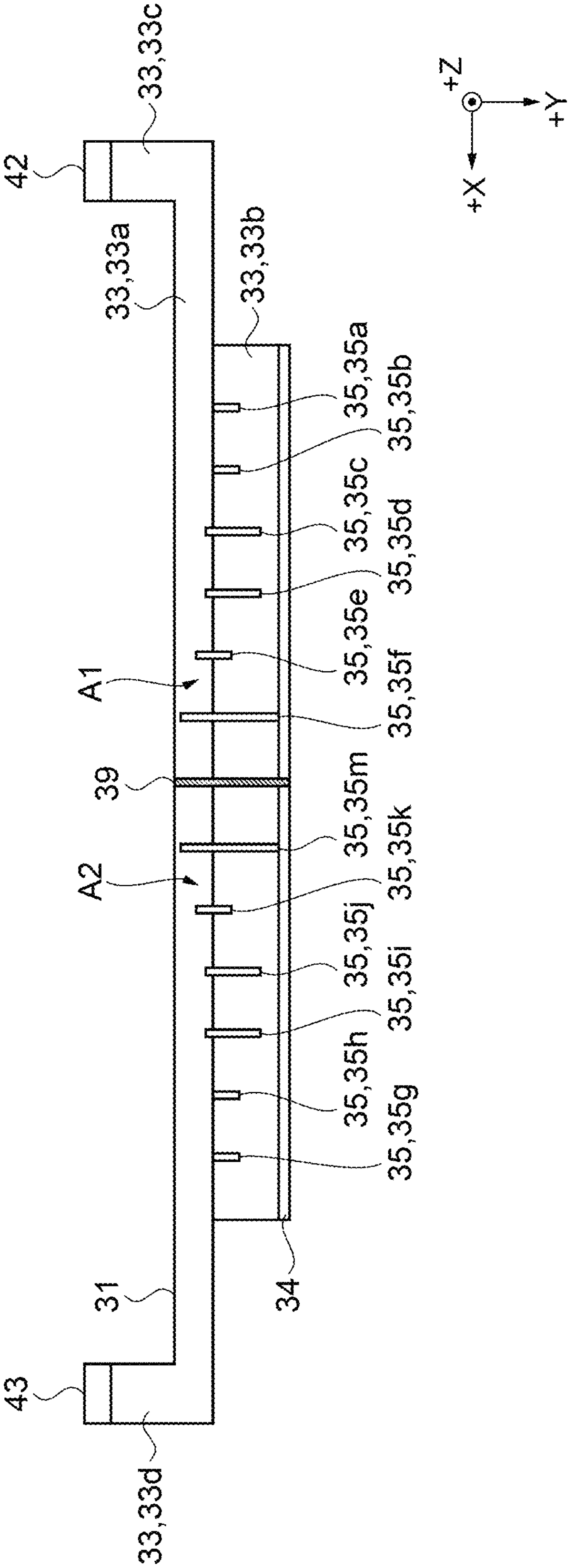
FIG. 17 is a diagram showing an example of schematic configuration of the airflow path.

FIG. 17 shows an example of schematic configuration of the airflow path 33. FIG. 17 shows an example of the arrangement and configuration of the plurality of flow path plates 35. FIG. 17 shows an X-Y cross section of the airflow path 33 as viewed from the +Z direction. The airflow path 33 is formed by the air duct 31, the plurality of flow path plates 35, and the dividing plate 39. The air duct 31 has the feed port 34 on its −Z direction surface. The air duct 31 is coupled to the first blower fan 42 and to the second blower fan 43. The air duct 31 has the feed port 34 on its −Z direction surface. The first blower fan 42 and the second blower fan 43 shown in FIG. 17 have the same configuration as the first blower fan 42 and the second blower fan 43 shown in FIGS. 13 and 14.

The airflow path 33 includes a first airflow path 33*a*, a second airflow path 33*b*, a third airflow path 33*c*, and a fourth airflow path 33*d*. The first airflow path 33*a*, the second airflow path 33*b*, the third airflow path 33*c*, and the fourth airflow path 33*d* shown in FIG. 17 have the same configuration as the first airflow path 33*a*, the second airflow path 33*b*, the third airflow path 33*c*, and the fourth airflow path 33*d* shown in FIGS. 13 and 14.

The plurality of flow path plates 35 shown in FIG. 17 are composed of members having the same shape and members having different shapes. The differently shaped members are configured with different lengths along the Y axis. The plurality of flow path plates 35 may have different cross-sectional shapes when viewed in the +X direction. The flow path plates 35 are arranged at positions having the same or different protrusion amounts into the first airflow path 33*a*. The plurality of flow path plates 35 are arranged at positions where air is fed along the X-axis from the feed port 34 with a desired flow rate distribution. By using the air duct 31 shown in FIG. 17, the flow rate distribution of air fed from the feed port 34 along the X-axis is constant or substantially constant over the X-axis.

Figure 18:
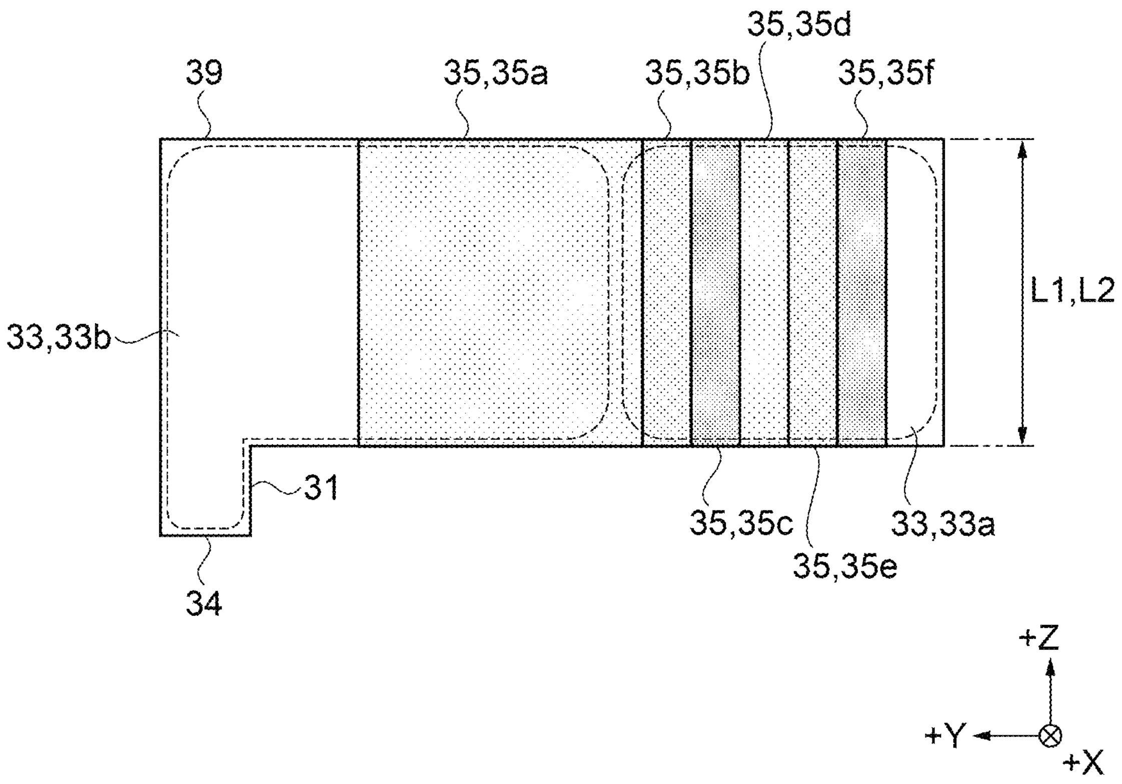
FIG. 18 is a view showing cross-sectional configuration of an air duct.

FIG. 18 shows cross-sectional configuration of the air duct 31. FIG. 18 shows a Y-Z cross section of the air duct 31. The cross-sectional shape of the air duct 31 shown in FIG. 18 is different from that of the air duct 31 shown in FIG. 15 or the like. The cross-sectional shape of the air duct 31 shown in FIG. 18 is a rectangular shape except for the vicinity of the feed port 34.

The airflow path 33 is formed in the air duct 31. FIG. 18 shows the first airflow path 33*a* and the second airflow path 33*b*. The first airflow path 33*a* is coupled to the third airflow path 33*c* shown in FIG. 6 at the −X direction end section. The Y-Z cross-sectional shape of the first airflow path 33*a* corresponds to the shape of the opening through which air flows at the connection section between the first airflow path 33*a* and the third airflow path 33*c*. The second airflow path 33*b* is coupled to the first airflow path 33*a* at a position in the −Y direction. The second airflow path 33*b* guides the air toward the feed port 34 formed at a position in the +Y direction.

The first airflow path 33*a* has a first height H1 along the Z axis. The second airflow path 33*b* has a second height H2 along the Z axis. In the air duct 31 shown in FIG. 18, the first height H1 is the same as the second height H2. The air duct 31 may be configured such that the first height H1 and the second height H2 are the same. The cross-sectional shape of the air duct 31 is appropriately set.

FIG. 18 shows the first flow path plate 35*a*, the second flow path plate 35*b*, the third flow path plate 35*c*, the fourth flow path plate 35*d*, the fifth flow path plate 35*e*, and the sixth flow path plate 35*f*. The first flow path plate 35*a*, the second flow path plate 35*b*, the third flow path plate 35*c*, the fourth flow path plate 35*d*, the fifth flow path plate 35*e*, and the sixth flow path plate 35*f* are disposed in the first airflow path 33*a* and the second airflow path 33*b*. The plurality of flow path plates 35 are arranged with a predetermined protrusion amount.

What is claimed is:

1. A liquid ejection device comprising:
a transport section configured to transport a medium along a first axis;
a liquid ejection section configured to eject a liquid to the medium transported along the first axis;
a housing that houses the transport section and the liquid ejection section;
a fan that is disposed at an end section of the housing along a second axis, which intersects the first axis of the housing, and that feeds air into the housing;
a flow path member in which are formed an opening along the second axis and a flow passage for guiding air that was fed in by the fan;
a first partition plate that is disposed in the flow path and that is configured to guide, toward the opening, air fed along the second axis; and
a second partition plate that is disposed in the flow path and that is configured to guide, toward the opening, air fed along the second axis, wherein
the flow path has a first flow path section configured to guide air along the second axis and a second flow path section configured to guide air toward the opening,
the first partition plate is arranged at a position closer to the fan than is the second partition plate,
the first partition plate and the second partition plate are provided in the first flow path section and the second flow path section, and
a first part of the first partition plate arranged in the first flow path section is narrower than a second part of the second partition plate arranged in the first flow path section.

2. The liquid ejection device according to claim 1, wherein the first partition plate and the second partition plate have the same shape.

3. The liquid ejection device according to claim 2, further comprising:
a cover member that is disposed in the flow path and that is configured to hinder air from being fed along the second axis.

4. The liquid ejection device according to claim 1, further comprising:
a second fan that is disposed at an other end section of the housing along the second axis and that is configured to direct air into the interior of the housing.

5. The liquid ejection device according to claim 1, further comprising:
a roll support member configured to support a roll around which the medium is wound, wherein
the housing has a housing upper surface above a position where the medium is transported and
the roll support member supports the roll at a position where at least a part of the roll is disposed further upward than the housing upper surface.

6. A liquid ejection device comprising:
a transport section configured to transport a medium along a first axis;
a liquid ejection section configured to eject a liquid to the medium transported along the first axis;
a housing that houses the transport section and the liquid ejection section;
a fan that is disposed at an end section of the housing along a second axis, which intersects the first axis of the housing, and that feeds air into the housing;
a flow path member in which are formed an opening along the second axis and a flow passage for guiding air that was fed in by the fan;
a first partition plate that is disposed in the flow path and that is configured to guide, toward the opening, air fed along the second axis;
a second partition plate that is disposed in the flow path and that is configured to guide, toward the opening, air fed along the second axis; and
a second fan that is disposed at an other end section of the housing along the second axis and that is configured to direct air into the interior of the housing.

7. The liquid ejection device according to claim 6, wherein
the first partition plate and the second partition plate have the same shape.

8. The liquid ejection device according to claim 7, further comprising:
a cover member that is disposed in the flow path and that is configured to hinder air from being fed along the second axis.

9. The liquid ejection device according to claim 6, further comprising:
a roll support member configured to support a roll around which the medium is wound, wherein
the housing has a housing upper surface above a position where the medium is transported and the roll support member supports the roll at a position where at least a part of the roll is disposed further upward than the housing upper surface.

10. A liquid ejection device comprising:

a transport section configured to transport a medium along a first axis;

a liquid ejection section configured to eject a liquid to the medium transported along the first axis;

a housing that houses the transport section and the liquid ejection section;

a fan that is disposed at an end section of the housing along a second axis, which intersects the first axis of the housing, and that feeds air into the housing;

a flow path member in which are formed an opening along the second axis and a flow passage for guiding air that was fed in by the fan;

a first partition plate that is disposed in the flow path and that is configured to guide, toward the opening, air fed along the second axis; and a second partition plate that is disposed in the flow path and that is configured to guide, toward the opening, air fed along the second axis, wherein at least one of the first and second partition plates is not disposed in the opening of the flow path member.

11. The liquid ejection device according to claim 10, wherein the flow path has a first flow path section configured to guide air along the second axis and a second flow path section configured to guide air toward the opening, the first partition plate is arranged at a position closer to the fan than is the second partition plate, the first partition plate and the second partition plate are provided in the first flow path section and the second flow path section, and a first part of the first partition plate arranged in the first flow path section is narrower than a second part of the second partition plate arranged in the first flow path section.

12. The liquid ejection device according to claim 10, wherein the first partition plate and the second partition plate have the same shape.

13. The liquid ejection device according to claim 12, further comprising:

a cover member that is disposed in the flow path and that is configured to hinder air from being fed along the second axis.

14. The liquid ejection device according to claim 10, further comprising:

a second fan that is disposed at an other end section of the housing along the second axis and that is configured to direct air into the interior of the housing.

15. The liquid ejection device according to claim 10, further comprising:

a roll support member configured to support a roll around which the medium is wound, wherein the housing has a housing upper surface above a position where the medium is transported and the roll support member supports the roll at a position where at least a part of the roll is disposed further upward than the housing upper surface.

* * * * *